US007112648B2

(12) United States Patent
Ono et al.

(10) Patent No.: US 7,112,648 B2
(45) Date of Patent: *Sep. 26, 2006

(54) POLYIMIDE FILM EXCELLENT IN ALKALI ETCHING PROCESSABILITY AND PUNCHABILITY

(75) Inventors: Kazuhiro Ono, Otsu (JP); Kan Fujihara, Otsu (JP); Kiyokazu Akahori, Otsu (JP)

(73) Assignee: Kaneka Corporation, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/480,899

(22) PCT Filed: Jun. 17, 2002

(86) PCT No.: PCT/JP02/06022

§ 371 (c)(1),
(2), (4) Date: Dec. 15, 2003

(87) PCT Pub. No.: WO02/102883

PCT Pub. Date: Dec. 27, 2002

(65) Prior Publication Data

US 2004/0127679 A1    Jul. 1, 2004

(30) Foreign Application Priority Data

Jun. 18, 2001  (JP)  ............................. 2001-184037

(51) Int. Cl.
C08G 69/26  (2006.01)

(52) U.S. Cl. .................. 528/353; 216/13; 156/230

(58) Field of Classification Search ............. 428/473.5; 528/353; 216/13; 156/230
See application file for complete search history.

(56) References Cited

U.S. PATENT DOCUMENTS 6,350,844 B1 *  2/2002  Ono et al. .................. 528/170
6,611,046 B1 *  8/2003  Yang ......................... 257/622

FOREIGN PATENT DOCUMENTS

| JP | 04-366161 | 12/1992 |
| JP | 05-283486 | 10/1993 |
| JP | 06-298974 | 10/1994 |
| JP | 06-334110 | 12/1994 |
| JP | 07-205255 | 8/1995 |
| JP | 08-143668 | 6/1996 |
| JP | 09-235373 | 9/1997 |
| JP | 10-097081 | 4/1998 |
| JP | 10-195214 | 7/1998 |
| JP | 2000-290372 | 10/2000 |
| JP | 2001-072781 | 3/2001 |

* cited by examiner

Primary Examiner—Rachel Gorr
(74) Attorney, Agent, or Firm—Hogan & Hartson LLP

(57) ABSTRACT

A polyimide film according to the present invention satisfies Condition (1) in which a tear propagation resistance variation $C_H$ is not more than 1.0 g, and/or Condition (2) in which a swelling coefficient $C_R$ after being dipped in an alkaline solution is not more than 20.0. By satisfying these conditions, workability of the polyimide film can be improved and working defects can be effectively prevented, thereby improving productivity of each step.

6 Claims, 5 Drawing Sheets

A SCHEMATIC DRAWING OF TEAR PROPAGATION RESISTANCE VALUE MEASUREMENT CHART

BEFORE DIPPED IN ALKALINE
SOLUTION (WEIGHT: MEASURED W0)

AFTER DIPPED IN ALKALINE
SOLUTION (WEIGHT: MEASURED W1)

AFTER DIPPED IN ALKALINE
SOLUTION (WEIGHT: MEASURED W2)

POLYIMIDE FILM EXCELLENT IN ALKALI ETCHING PROCESSABILITY AND PUNCHABILITY

TECHNICAL FIELD

The present invention relates to polyimide films with superior workability, and particularly relates to polyimide films with superior workability in chemical etching using an alkaline solution (alkali etching) and with superior stamping workability.

BACKGROUND ART

In recent years, various types of polyimide resins have been used in many applications because they are superior in heat resistance, flame resistance, and chemical resistance, in addition to having superior electrical properties and superior mechanical strength. Specific applications include various components of electrical devices. For example, polyimide films have been used in flexible printed wiring circuit boards ("FPC" hereinafter), film carriers for tape automated bonding ("TAB" hereinafter), and chip-on-flex or chip-on-film ("COF" hereinafter). Other applications include a structural material for aircraft and the like.

One way of processing the polyimide film is etching. For example, in film carriers for FPC, TAB, and COF, a substrate is prepared from a film of polyimide. The polyimide film is partially etched to form through holes through the polyimide film of the substrate. In the application for a structural material for aircraft for example, the polyimide film is often chemically etched to provide a rough surface (surface roughing method), so as to improve surface properties such as surface wettability.

These and other etching methods and etchants have been proposed as etching techniques of the polyimide resin.

For example, Japanese Publication for Unexamined Patent Application No. 298974/1994 (Tokukaihei 6-298974; published on Oct. 25, 1994) discloses an etchant whose primary components are alkali hydroxide, hydrazine, and 1,3-dimethyl-2-imidazolidine. In another example, Japanese Publication for Unexamined Patent Application No. 195214/1998 (Tokukaihei 10-195214; published on Jul. 28, 1998) discloses an etchant that contains aliphatic alcohol, aliphatic amine, alkali metal compounds, and water. Further, Japanese Publication for Unexamined Patent Application No. 97081/1998 (Tokukaihei 10-97081; published on Apr. 14, 1998) discloses an etchant that contains oxyalkyl amine and alkali metal compounds.

All of these etchants disclosed in the foregoing publications allow the polyimide film to be etched quickly and desirably, regardless of the type of polyimide film. Note that, as the term is used herein, "desirable etching" means that the polyimide film is etched stably so that predetermined shapes and dimensions are obtained.

As the foregoing conventional examples indicate, the main focus of chemical etching of the polyimide film has been to improve the etchant.

It is recognized, however, that the foregoing conventional methods cause swelling on portions of the polyimide film in contact with the etchant. The swelling may cause working defects on the polyimide film.

Specifically, all of the foregoing conventional techniques etch the polyimide film using an alkali solution. Dipping the polyimide film in the alkali solution generates a gel-like substance on film surfaces. Throughout the specification of this invention, such a gel-like substance will be referred to as "swelling".

The cause and composition of the swelling are assumed to be such that the swelling is:

(1) a substance that is generated by the reaction of the polyimide converting itself to polyamic acid in the presence of the alkali that opens the polyimide rings;

(2) a substance that is generated by the reaction of the polyimide converting itself to monomers by being decomposed by the alkali;

(3) a mixture of (1) and (2); and (4) low-molecular-weight compounds that are generated when the main chains of the polyimide and polyamic acid are incised. However, no analysis has definitively proved these assumptions.

In etching the polyimide film to form through holes for example, the polyimide film is first masked with an alkali resistant resin or an alkali resistant metal. Etching is carried out after the mask has been removed only from portions of the polyimide film where the through holes are to be formed.

Such a method inevitably generates swelling on side faces of the through holes and end faces of the film because these portions of the polyimide film are not protected by the alkali resistant mask. Drying the film without completely dissolving and removing the swelling in the etching step and washing step causes the swelling to remain as a residue on the through holes and the end faces of the film. This causes working defects.

The working defects become more prominent as the diameter of the perforations of the polyimide film formed by etching become smaller. In other words, the working defects worsen when the process involves narrower polyimide films. Generally, the swelling (residue) that causes working defects generates in the form of a film or a thread at the perforated portions of the film where the upper and lower surfaces of the film meet. The presence of swelling therefore inhibits electrical conduction at the perforated portions and lowers reliability of the product.

One technique to avoid working defects that are caused by swelling is, for example, the etching method disclosed in Japanese Publication for Unexamined Patent Application No. 283486/1993 (Tokukaihei 5-283486; published on Oct. 29, 1993). This etching method removes polyamic acid (swelling) that results from etching. A problem of this method, however, is that it requires many steps and has poor productivity.

Beside the working defects at the perforations, etching causes another problem in the step of forming perforations, such as the through holes, in the manufacturing process of FPC for example. Namely, the polyimide film is curled (locally wrinkled) by the etchant, such as an alkali solution, which exposes the film. The curling of the film has detrimental effects on a yield in later processes.

Incidentally, an example of a substrate that uses the polyimide resin is a lead frame of an LOC (Lead on Chip) structure that enables high-density mounting. The lead frame of an LOC structure has been put to actual applications in the form of a prefabricated lead frame of a structure in which a film coated with an adhesive (such as thermoplastic adhesive or heat curable adhesive) is attached to the both sides of a heat-resistant polyimide film, so that semiconductor chips can be mounted thereon.

Conventionally, the polyimide film is attached to the lead frame by a stamping-and-attach method using a stamping mold. In this method, the polyimide film is stamped into strips and attached to the lead of the lead frame that is positioned below.

A drawback of this stamping-and-attach method is that flashes or chips of film are generated at the edges of the stamped film. This causes working defects.

For example, Japanese Patent No. 2923170 (Tokukaihei 6-334110; published on Dec. 2, 1994, registered on Apr. 30, 1999) discloses a technique to avoid working defects that are caused by stamping. Specifically, this publication discloses a polyimide film with a tear resistance of 50 kgf/20 mm to 70 kgf/20 mm, so as to provide a film having improved stamping workability.

However, the technique disclosed in this publication only improves workability of film stamping and the publication does not teach anything about improving etching workability using the alkali solution and at the same time improving stamping workability of the film.

To date, there has been no prior art technique that teaches improving etching workability using the alkali solution and at the same time improving stamping workability of the film.

The present invention was made in view of the foregoing problems and it is an object of the present invention to provide polyimide films that have superior workability, both in etching and stamping, and which effectively prevent working defects and improve productivity of each step.

DISCLOSURE OF THE INVENTION

After extensive research aiming at improving workability of a polyimide film and thus achieving the foregoing objects, the inventors of the present invention made the invention based on a finding that workability could be improved by regulating swelling in a chemical etching process and by regulating a variation of tear propagation resistance values.

That is, a polyimide film according to the present invention has a tear propagation resistance variation of not more than 1.0 g.

Specifically, the polyimide film according to the present invention preferably has a repeating unit of the following formula (1) in the molecules.

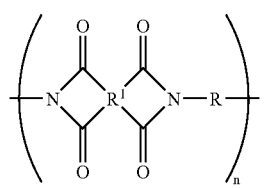

(1)

where R is

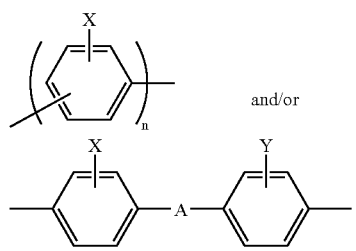

and/or and where n of the group R is an integer of 1 to 3, X and Y are independently a hydrogen, a halogen, a carboxyl group, a lower alkyl group with no greater than 6 carbon atoms, or a lower alkoxy group with no greater than 6 carbon atoms, and A is —O—, —S—, —CO—, —$SO_2$—, or —$CH_2$—. In formula (1), $R^1$ is selected from the group consisting of

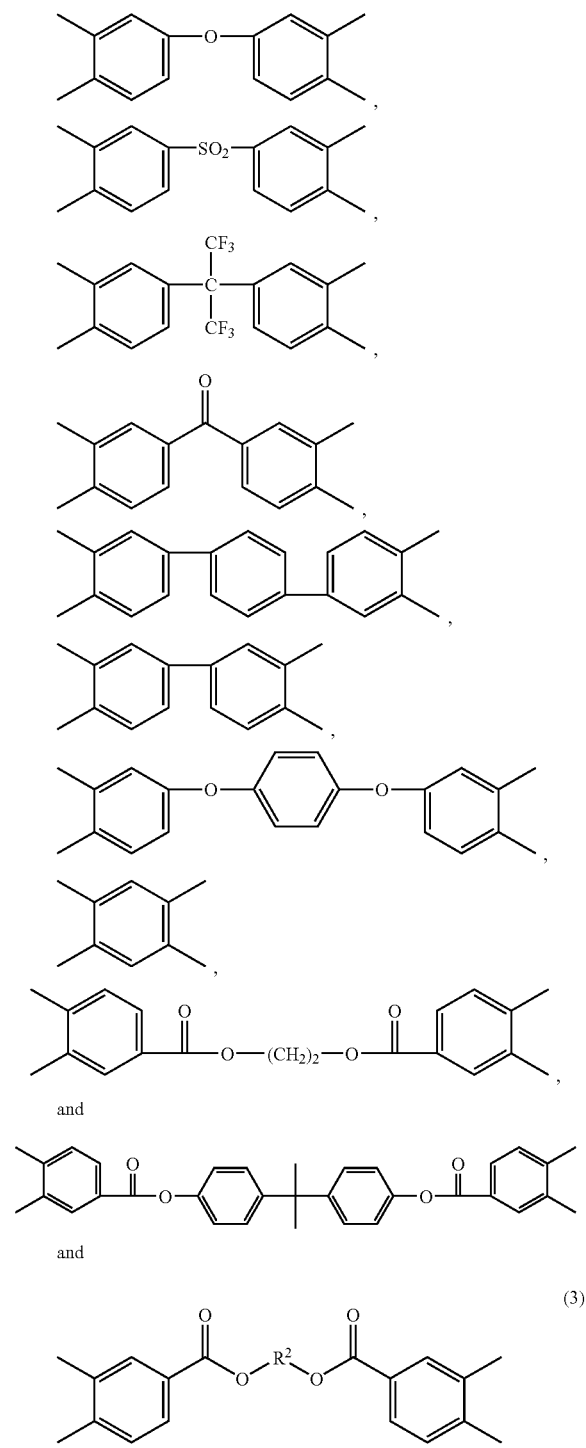

and (3)

where $R^2$ in formula (3) is a divalent organic group that is selected from the group consisting of

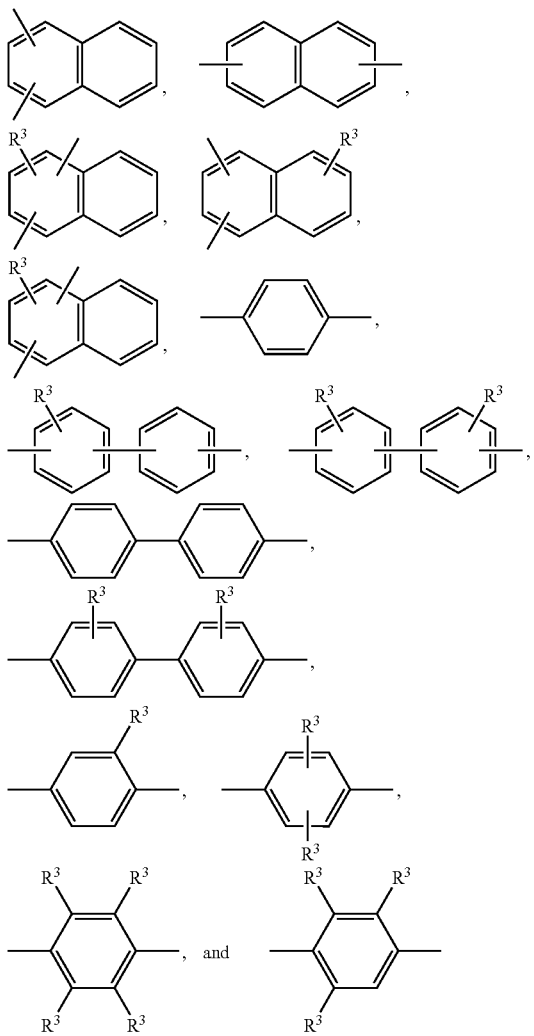

where $R^3$ is independently —$CH_3$, —Cl, —Br, —F, or —$CH_3O$.

The polyimide film according to the present invention preferably has a swelling coefficient of not more than 20.0 after being dipped in an alkaline solution. In order to reduce the swelling coefficient, it is preferable that the polyimide film according to the present invention includes a repeating unit of the following formula (2) in the molecules.

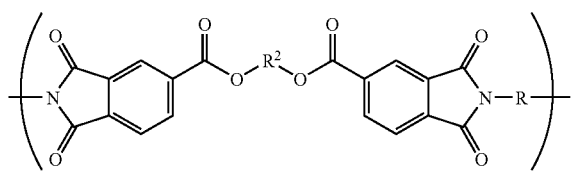

(2)

where R is the same as that of formula (1), and $R^2$ is the same as that of formula (3).

It is preferable that the polyimide film according to the present invention contains not less than 25 mol % of paraphenylene diamine and not less than 25 mol % of 4,4-diaminodiphenylether, both as diamine components, with respect to the total diamine component.

According to this configuration, by regulating a variation of tear propagation resistance values and/or a swelling coefficient, it becomes possible to prevent flashes and chips of film from being generated in the etching process using an alkaline solution. In addition, swelling can be prevented in the etching process using an alkaline solution. This renders the polyimide film according to the present invention superior workability, thereby improving productivity in each step.

Namely, the polyimide film according to the present invention can have superior tear propagation resistance by including at least the repeating unit of formula (1). By further including the repeating unit of formula (2), the swelling coefficient can be reduced and a superior alkali etching property can be realized.

For a fuller understanding of the nature and advantages of the invention, reference should be made to the ensuing detailed description taken in conjunction with the accompanying drawings.

BRIEF DESCRIPTION OF DRAWINGS

FIG. 3(a) through FIG. 3(c) are schematic drawings showing swelling and states of a polyimide film when measuring film weights to determine swelling coefficients, in which FIG. 3(a) is a state before the polyimide film is dipped in an alkaline solution, FIG. 3(b) is a state after the polyimide film is dipped in the alkaline solution and swelling has generated, and FIG. 3(c) is a state after the swelling has been removed from the polyimide film out of the alkaline solution.

BEST MODE FOR CARRYING OUT THE INVENTION

Figure 1:
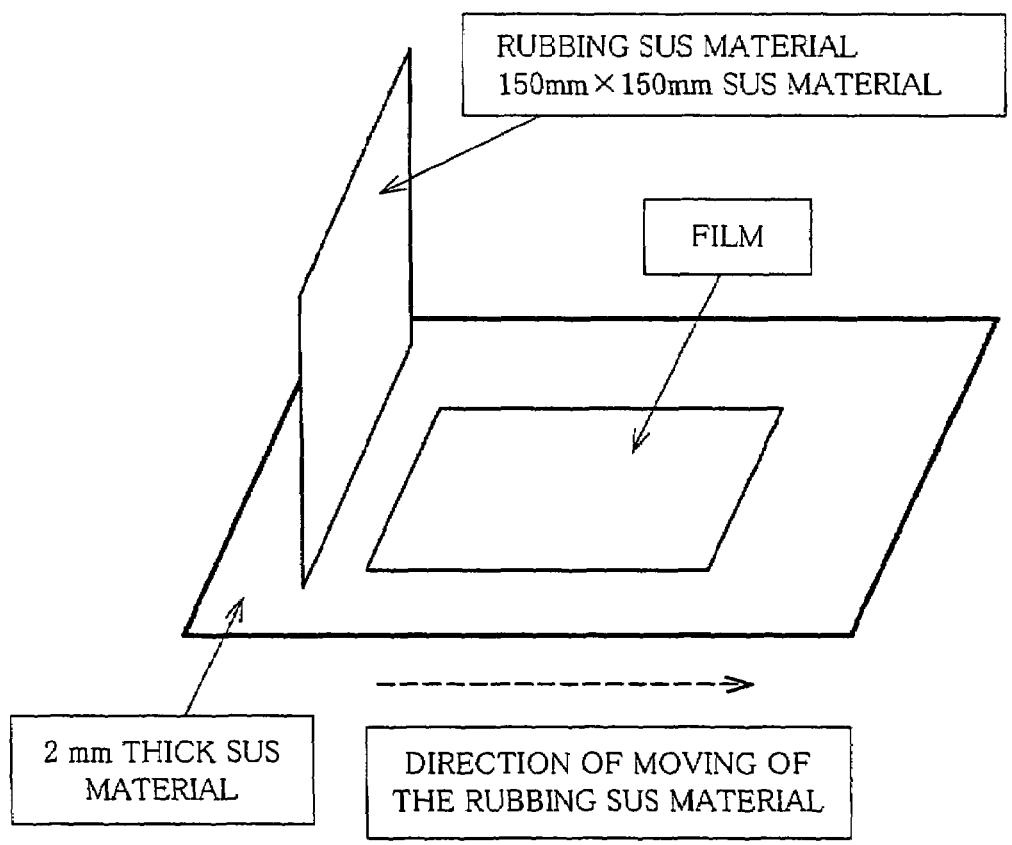
FIG. 1 is a schematic drawing briefly showing an example of a swelling removing method.

One embodiment of the present invention is described below in detail. The following descriptions do not limit the present invention in any ways.

A polyimide film according to the present invention satisfies at least one of the following two conditions:

(1) A tear propagation resistance variation $C_H$ is 1.0 g or less.

(2) A swelling coefficient $C_R$ of the polyimide film after it was dipped in an alkaline solution is 20.0 or less, preferably 10.0 or less, or more preferably 5.0 or less.

By satisfying the condition (1), the polyimide film does not generate flashes or chips of film in a stamping process ("stamping step"). By satisfying the condition (2), the polyimide film does not generate swelling in an etching process using an alkaline solution ("alkali etching step"). Thus, by satisfying at least one of the foregoing conditions (1) and (2), the polyimide film according to the present invention can improve productivity of each step. By satisfying both of the foregoing conditions (1) and (2), a superior alkali etching property and superior stamping workability can be obtained.

The polyimide film according to the present invention is not particularly limited as long as it satisfies the foregoing conditions (1) and/or (2). Preferably, the polyimide film according to the present invention includes a repeating unit of the formula (1) below in the molecules.

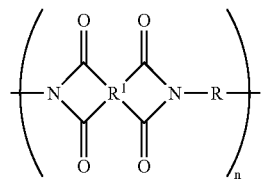
(1)

where R is

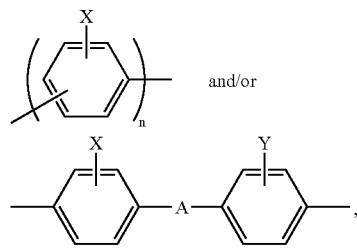
and/or and where n of the group R is an integer of 1 to 3, X and Y are independently a hydrogen, a halogen, a carboxyl group, a lower alkyl group with no greater than 6 carbon atoms, or a lower alkoxy group with no greater than 6 carbon atoms, and A is —O—, —S—, —CO—, —SO$_2$—, or —CH$_2$—. In formula (1), R$^1$ is selected from the group consisting of

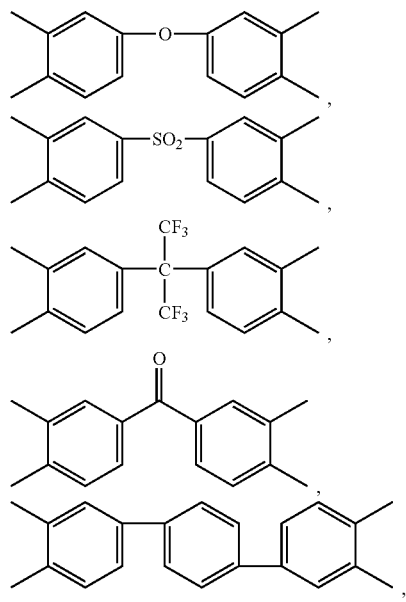

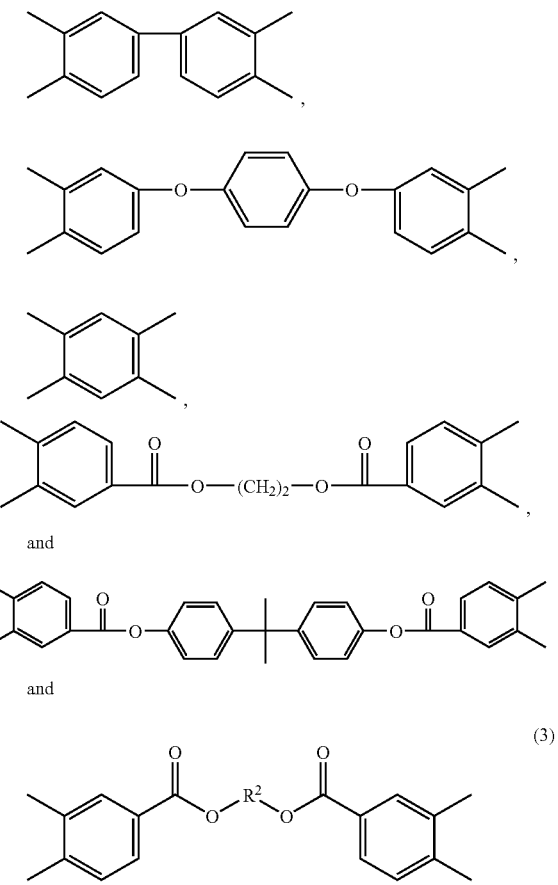

(3)

where R$^3$ is independently —CH$_3$, —Cl, —Br, —F, or —CH$_3$O. R$^2$ in formula (3) is a divalent organic group that is selected from the group consisting of

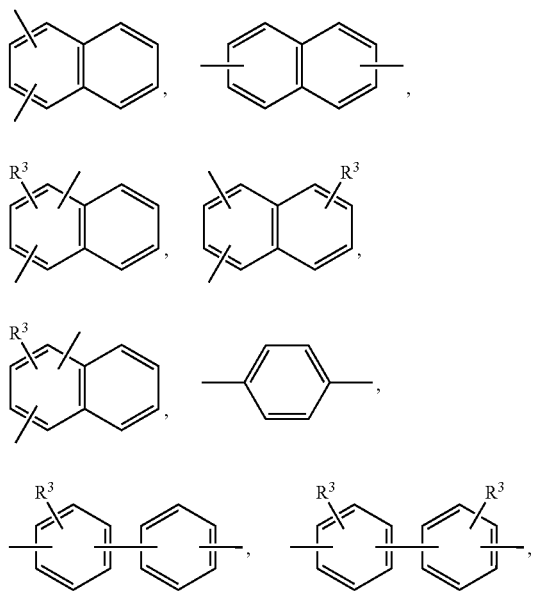

where $R^4$ is a divalant organic group selected from the group consisting of

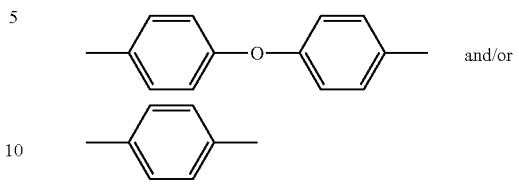

and/or

By including the repeating unit of formula (4), the polyimide film according to the present invention can further improve its tear propagation resistance property and alkali etching property.

More preferably, the polyimide film according to the present invention includes a repeating unit of formula (5) below, in addition to the repeating unit of formula (4) above.

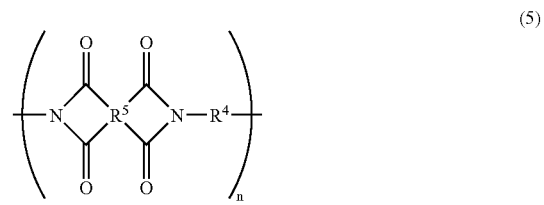

(5)

where $R^5$ is a at least two kinds selected from the group consisting of

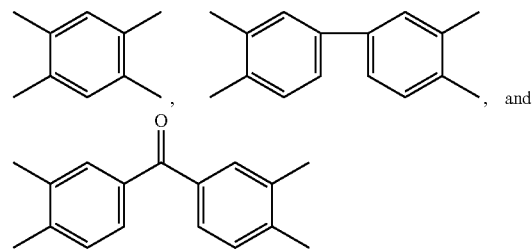

and $R^4$ is a divalent organic group that is represented by

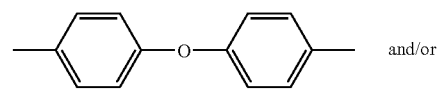

and/or

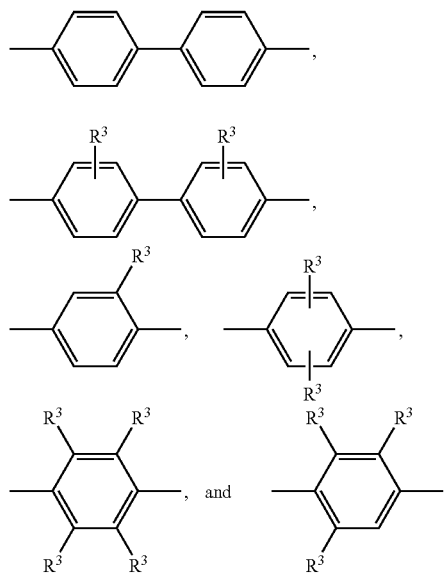

By including at least the repeating unit of formula (1), the polyimide film according to the present invention can have a superior tear propagation resistance property, satisfying the foregoing condition (1).

In order to reduce the swelling coefficient, the polyimide film according to the present invention preferably includes a repeating unit of the following formula (2) in the molecules.

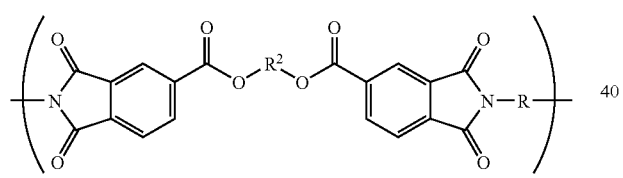

(2)

where R is the same as that of formula (1), and $R^2$ is the same as that of formula (3).

By including at least the repeating structure of formula (2), the polyimide film according to the present invention can satisfy both of the foregoing conditions (1) and (2), thereby realizing a superior tear propagation resistance property and a superior alkali etching property.

More preferably, the polyimide film according to the present invention includes a repeating unit of the following formula (4)

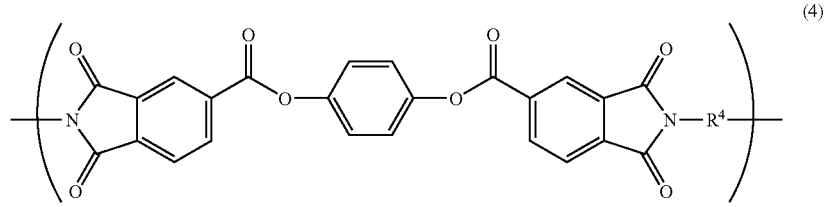

(4)

-continued

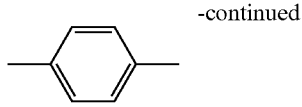

That is, $R^4$ in formula (5) is the same divalent organic group of $R^4$ in formula (4).

By including the repeating unit of formula (5) in addition to that of formula (4), the polyimide film according to the present invention can further improve its tear propagation resistance property and alkali etching property.

More preferably, the polyimide film according to the present invention chiefly includes repeating units of the following formulae (6) through (9).

nent. More preferably, the polyimide film according to the present invention can be obtained by containing paraphenylene diamine within a range of 30 mol % to 70 mol %, inclusive, with respect to the total diamine component, and 4,4'-diaminodiphenylether within a range of 30 mol % to 70 mol %, inclusive, with respect to the total diamine component.

By adjusting the diamine components within the foregoing ranges, the polyimide film can have suitable properties (characteristics) for the FPC base films. Specifically, the polyimide film will have an absorbency of not more than 2.0%, a coefficient of linear expansion of not more than 25 ppm/° C. (at 100° C. to 200° C.), a coefficient of hygroscopic expansion of not more than 10 ppm/° C., an elastic modulus of 4.0 GPa to 8.0 GPa, and a stretched percent elongation of not less than 20%.

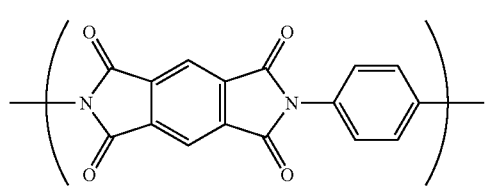
(6)

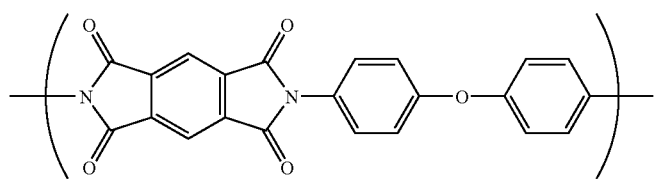
(7)

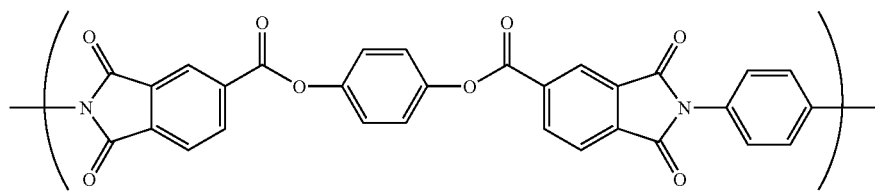
(8)

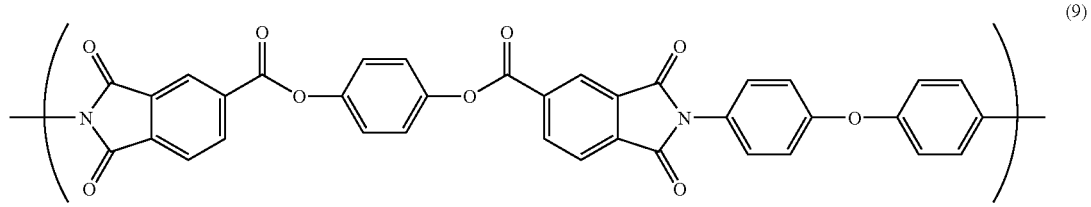
(9)

By including these formulae (6) through (9), the policed film according to the present invention can further improve its tear propagation resistance property and alkali etching property.

The polyimide film according to the present invention can be obtained by containing not less than 25 mol % of paraphenylene diamine and not less than 25 mol % of 4,4'-diaminodiphenylether, both as diamine components, with respect to the total diamine component.

The polyimide film according to the present invention can be obtained by containing paraphenylene diamine preferably within a range of 25 mol % to 75 mol %, inclusive, with respect to the total diamine component, and 4,4'-diaminodiphenylether preferably within a range of 25 mol % to 75 mol %, inclusive, with respect to the total diamine component.

Using the diamine components outside the foregoing ranges fails to obtain the foregoing suitable properties for the polyimide film, which makes it difficult to use and process the polyimide film as an FPC base film.

A producing process of the polyimide film according to the present invention is described below.

First, in the present embodiment, an acid dianhydride component is allowed to react with an equimolar amount of a diamine component in an organic solvent, so as to prepare an organic solvent solution of polyamic acid ("polyamic acid solution" hereinafter), which is the precursor of the polyimide. The polyamic acid solution, after being mixed with a catalyst and a dehydrating agent, is applied over a support by flow-casting. Drying and heating the polyamic acid solution produces a polyimide film.

The organic solvent used to prepare the polyamic acid solution; that is, the organic solvent used to polymerize the polyamic acid is not particularly limited and the following organic solvents can be used for example. Ureas such as tetramethyl urea and N,N-dimethylethyl urea; sulfoxides or sulfones such as dimethyl sulfoxide, diphenyl sulfone, and tetramethyl sulfone; amides such as N,N-dimethylacetoamide, N,N-dimethylformamide, N,N-diethylformamide, N,N-diethylacetoamide, N-methyl-2-pyrrolidone, γ-butyllactone, and hexamethylphosphoric triamide; aprotic solvents such as phosphoryl amides; halogenated alkyls such as chloroform and methylene chloride; aromatic hydrocarbons such as benzene and toluene; phenols such as phenol and cresol; and ethers such as dimethyl ether, diethyl ether, and p-cresol methylether. These organic solvents are usually used individually but may suitably be used in combinations of two or more kinds as required.

Among these organic solvents, N,N-dimethylformamide, N,N-diethylacetoamide, and N-methyl-2-pyrrolidone are particularly suitable. These organic solvents may be used either individually or in a mixture of any proportions. As the organic solvents used in the present embodiment, commercially available super-rate or first-rate products may be directly used. Alternatively, these commercially available organic solvents may be dehydrated and purified by ordinary methods such as dehydration and distillation.

The polymerization method of the polyamic acid, i.e., the preparation method of the polyamic acid solution is not particularly limited and any conventional methods can be used therefor. Specifically, for example, methods disclosed in Japanese Publication for Unexamined Patent Application No. 235373/1997 (Tokukaihei 7-235373; published on Sep. 9, 1997) can be suitably used. With the methods disclosed in this publication, a highly elastic polyimide film with a low coefficient of thermal expansion and a low vacancy rate can be obtained.

Polymerization of the polyamic acid is generally carried out in two steps. In the first step, a low viscous polyamic acid, known as a pre-polymer, is polymerized. In the second step, an organic solvent dissolving an acid dianhydride is added to obtain a high viscous polyamic acid. Preferably, a filtering step is provided between the first step and the second step, so that undissolved raw materials and/or foreign objects in the pre-polymer can be removed through a filter.

The mesh size of the filter used in the filtering step is not particularly limited. Preferably, the mesh size is ½ the thickness of the polyimide film, more preferably ⅕ the thickness of the polyimide film, and even more preferably ¹⁄₁₀ the thickness of the polyimide film.

Defects caused by undissolved raw materials and/or foreign objects on a surface of the polyimide film lowers adhesion between the polyimide film and the mask, when the mask is formed on the polyimide film in the alkali etching step. This causes the alkaline solution (etchant) to spread into a spacing between the polyimide film and the mask from the portion of low adhesion, with the result that the perforations have shapes not originally intended. The filtering step prevents this by preventing entry of foreign objects into the polyimide film and by preventing defects.

The composition of the polyamic acid solution is not particularly limited. Preferably, the polyamic acid dissolved in the organic solvent is 5 wt % to 40 wt %, more preferably 10 wt % to 30 wt %, or even more preferably 13 wt % to 25 wt %. The polyamic acid dissolved in the organic solvent within these ranges is preferable because it improves ease of handling.

The molecular weight of the polyamic acid is not particularly limited either. Preferably, the polyamic acid has a weight average molecular weight Mw of not less than 10,000, or more preferably not less than 50,000. With a weight average molecular weight at or above these lower limits, the polyimide film with superior properties can be obtained.

A measurement method of molecular weight of the polyamic acid is not particularly limited and various conventional methods such as GPC (Gel Permeation Chromatography) can be suitable used. The present embodiment determined lower limits of weight average molecular weight by performing GPC under the following conditions.

Column: TSKgel α-M, α-3000, α-2500 (the product of Tosoh Corporation)

Moving phase: N,N-dimethylformamide (DMF), 0.03 M phosphoric acid, 0.03 M lithium bromide.

Flow rate: 0.6 ml/min

Detection: RI

Column temperature: 40° C.

Sample preparation: A sample was prepared by dissolving polyamic acid in a moving phase (at the concentration of 10 mg/ml in the varnish weight). The amount of injection was 100 μl.

In the present invention, a specific method of obtaining the polyimide composition from the polyamic acid solution is not particularly limited. That is, the present invention does not particularly limit a method of producing the polyimide film from the organic solvent solution of the polyamic acid. Namely, the present invention can employ either heating methods (heat curing method, thermal ring closure method) that thermally promote dehydration and ring closure, or chemical methods (chemical curing method, chemical ring closure method) that uses a dehydrating agent.

The heating method promotes imidization solely by heat, without actions of dehydrating or ring-closing agent. The temperature and other conditions of heating are not particularly limited and conventional conditions can be suitably used.

One specific example of procedures of the heating method is described below. First, the organic solvent solution of polyamic acid containing no dehydrating agent and no catalyst is applied through a slit adopter over a support such as a drum or an endless belt by flow-casting, so as to shape the organic solvent solution of the polyamic acid into a film. The film was then dried on the support by being heated for 1 to 20 minutes at a temperature of no higher than 200° C. The product is a self-supporting gel film. The gel film is detached from the support and anchored at the both ends. The gel film is then heated from 100° C. to about 600° C. either gradually or stepwise, so as to promote imidization. After gradual cooling, the gel film, which has been anchored at the both ends, is released. The polyimide film according to the present invention is obtained in the described manner.

The maximum heating temperature of the gel film should preferably be no less than 520° C., or more preferably no less than 530° C., because a temperature in these ranges reduces variations of tear propagation strengths. A heating temperature with these lower limits can produce the polyimide film with properties that satisfy at least the foregoing condition (1).

The chemical method promotes imidization by the actions of a chemical converting agent and, preferably, a catalyst, on the polyamic acid solution.

One specific example of procedures of the chemical method is described below. First, a mixture of the organic solvent solution of polyamic acid with greater than stoicheometric amounts of dehydrating agent and catalyst is applied through a slit adopter over a support such as a drum or an endless belt by flow-casting, so as to shape the organic solvent solution of the polyamic acid into a film. The film was then dried on the support by being heated for 1 to 20 minutes at a temperature of no higher than 200° C. The product is a self-supporting gel film. The gel film is detached from the support and anchored at the both ends. The gel film is then heated from 100° C. to about 500° C. either gradually or stepwise, so as to promote imidization. After gradual cooling, the gel film, which has been anchored at the both ends, is released. The polyimide film according to the present invention is obtained in the described manner.

The dehydrating agent is not particularly limited and aliphatic acid anhydrides such as acetic anhydride, and aromatic acid anhydrides can be suitably used. The catalyst is not particularly limited either. For example, the following catalysts can be suitably used: aliphatic tertiary amines such as triethylamine; aromatic tertiary amines such as dimethyl aniline; and heterocyclic tertiary amines such as pyridine and isoquinoline. Among these dehydrating agents and catalysts, acetic anhydride is preferable for the dehydrating agent and isoquinoline is preferable for the catalyst.

In the chemical method, as with the polymerization of polyamic acid, it is preferable to provide the filtering step for removing undissolved raw materials and/or foreign objects using a filter, before mixing the dehydrating agent and catalyst with the polyamic acid solution.

The mesh size of the filter used in the filtering step is not particularly limited. Preferably, the mesh size is ½ the thickness of the polyimide film, more preferably ⅕ the thickness of the polyimide film, and even more preferably ¹⁄₁₀ the thickness of the polyimide film.

Defects caused by undissolved raw materials and/or foreign objects on a surface of the polyimide film lowers adhesion between the polyimide film and the mask, when the mask is formed on the polyimide film in the alkali etching step. This causes the alkaline solution (etchant) to spread into a spacing between the polyimide film and the mask from the portion of low adhesion, with the result that perforations have shapes not originally intended. The filtering step prevents this by preventing entry of foreign objects into the polyimide film and by preventing defects.

In the chemical method, the amount of dehydrating agent and catalyst added with respect to the polyamic acid solution, i.e., the content of dehydrating agent and catalyst with respect to the polyamic acid in the mixed solution varies depending on the structural formula of the polyamic acid.

The dehydrating agent is used at a mole ratio of 10 to 0.01 with respect to the amide group in the polyamic acid. That is, the number of moles of dehydrating agent/the number of moles of amide group in the polyamic acid=10 to 0.01. The catalyst is used at a mole ratio of 5 to 0.5 with respect to the amide group in the polyamic acid. That is, the number of moles of catalyst/the number of moles of amide group in the polyamic acid=10 to 0.01. It is more preferable that the number of moles of dehydrating agent/the number of moles of amide group in the polyamic acid=5 to 0.5, and the number of moles of catalyst/the number of moles of amide group in the polyamic acid=5 to 0.5. In this case, a gelling retardant such as acetyl acetone may additionally be used.

Further, instead of the mole ratio with respect to the amide group in the polyamic acid, the amount of dehydrating agent and catalyst added to the polyamic acid solution may be determined according to the time required for the viscosity to start increasing from the time the polyamic acid was mixed with the mixture of the dehydrating agent and catalyst at 0° C. (pot life).

Generally, a pot life of 0.1 to 120 minutes is preferable, and 0.5 to 60 minutes is more preferable. Various problems are caused when the pot life deviates from these ranges by a large margin. For example, a pot life below 0.1 minutes impairs properties of the gel film, such as surface properties and appearance. A pot life longer than 120 minutes causes problems in detaching the gel film from the support, such as a drum, after the gel film has been cast.

The chemical method and the heating method may be used either individually or in combination. Generally, the chemical method has the advantage of producing polyimide films with superior mechanical strengths such as percent elongation and tensile strength, and requiring a shorter time for imidization. Regardless of whether the chemical method and the heating method are used individually or in combination, reaction conditions concerning imidization are not particularly limited and vary depending on various factors, such as the type of polyamic acid, the thickness of polyamic acid film or polyimide film, and how the chemical method and/or the heat method are selected.

In using either the heating method or the chemical method, various additives may be added to the polyamic acid solution. The additives may be conventional ones, for example, such as antioxidants, light stabilizers, flame retardants, antistatic agents, heat stabilizers, UV absorbing agents, inorganic fillers, and various strengthening agents. These additives may be suitably selected according to the type and use of the polyimide film and are not particularly limited. Further, the additives may be used either individually or in combination.

The base films used for FPC, TAB, and COF are used roll-to-roll and should preferably have ease of slipperiness. Specifically, the ease of slipperiness is realized preferably by mixing inorganic fillers.

A drawback of mixing inorganic fillers, however, is that the inorganic filler added forms projectiles on a film surface. The projectiles, when large, lower adhesion between the mask material and the film in alkali etching. This causes the alkaline solution to spread into a gap between the film and the mask material from the portion of low adhesion. This may cause working defects. The projectiles also cause problems in circuit fabrication (patterning) when the polyimide film is used in a bi-layer of the polyimide film and a metal layer in contact with each other in a circuit board fabrication process.

In recent years, increasingly narrower circuit width and circuit pitch have been adopted. Currently, the circuit width and circuit pitch are about 25 μm each, for example, and they are very likely to narrow farther. The projectiles on the films are problematic in this trend of finer patterns. Preferably, the size of the projectiles should be such that, specifically, the height is no more than ⅕ of the circuit height, and the diameter is no more than ⅓ of the smaller of the circuit width and circuit pitch. In the case where a metal layer is used for the mask material in alkali etching, the projectiles of the film should preferably have a diameter no more than ⅕ of a diameter of a desired opening, in addition to satisfying the foregoing ranges.

The polyimide film according to the present invention is produced by the foregoing producing process, and, as described already, satisfies the condition (1), in which the tear propagation resistance variation $C_H$ is 1.0 g or less, and/or the condition (2), in which a swelling coefficient $C_R$ of the polyimide film after it was dipped in an alkaline solution is 20.0 or less, preferably 10.0 or less, or more preferably 5.0 or less.

The polyimide film according to the present invention can be used in various applications according to its properties. The polyimide film according to the present invention is particularly suitable in the areas of electrical device components, for example, such as flexible printed circuit boards (FPC), film carriers for tape automated bonding (TAB), and ship-on-flex (COF). When used in these applications, the polyimide film is processed by chemical etching and stamping. The workability of these processes can be improved when the polyimide film according to the present invention satisfies the foregoing conditions (1) and/or (2).

In the present invention, the etching method and stamping method used to process the polyimide film are not particularly limited and various conventional methods can be suitably used. As the etching method, chemical etching using conventional alkaline solutions (alkali etching) is suitable. As the stamping method, various conventional methods using a mold are suitable. That is, the process of the polyimide film according to the present invention should include at least one of an etching step and a stamping step, both of which can be carried out by conventional methods.

The following more specifically describes the conditions satisfied by the polyimide film according to the present invention. The swelling coefficient $C_R$ in the condition (2) is defined by the following equation (i)

$$C_R = [D2-D1]/D2 \times 100 \qquad \text{(i)}.$$

where D1 and D2 are the reduction rates of an alkali weight, which are defined based on a film weight that is calculated by a swelling coefficient calculating test as described below.

First, a polyimide film measuring 100 mm×100 mm is placed in an oven and dried therein at 150° C. for 15 minutes. A film weight W0 after an elapsed time of 30 seconds from the time the polyimide film was taken out of the oven is measured. In the description that follows, the film weight is the measured value after an elapsed time of 30 seconds from the end of drying. Further, the film is dried and measured in a constant-temperature and constant-humidity room with a maintained humidity of 60% RH and a maintained temperature of 23° C.

The polyimide film is then dipped in an alkaline solution (etchant) and later washed by a predetermined washing method (either allowed to stand in distilled water or washed in distilled water by ultrasonic). The polyimide film after washing is dried for 15 minutes at 150° C. and a film weight W1 is measured.

Thereafter, another polyimide film is prepared and a film weight W0' of this film is measured after drying the film at 150° C. for 15 minutes in the same manner. The polyimide film is then dipped in an alkaline solution and swelling on the film is removed in distilled water by rubbing the film with a stainless steel material (SUS-304) measuring 150 mm×150 mm. The polyimide film is dried at 150° C. for 15 minutes and a film weight W2 is measured.

The alkali weight reduction rate D1 is defined by the film weight W0 and the film weight W1 that are measured by the foregoing process. The alkali reduction rate D2 is defined by the film weight W0' and the film weight W2. D1 and D2 are given by the following equations (ii) and (iii), respectively.

$$D1 = (W0-W1)/W0 \times 100 \qquad \text{(ii)}$$

$$D2 = (W0'-W2)/W0' \times 100 \qquad \text{(iii)}.$$

In the swelling coefficient calculating test, the polyimide film was dipped in the alkaline solution under the conditions described below.

The alkaline solution was prepared by adding and dissolving potassium hydroxide (KOH) in an aqueous solution of an 8:2 weight ratio (wt %) of ethanol and distilled water to a final concentration of 1 mole/litter. The polyimide film was dipped in the alkali solution for 5 minutes.

In the following, a swelling removing method in the swelling coefficient calculating method is specifically described. The swelling removing method is not particularly limited and any method may be used so long as swelling on surfaces of the polyimide film is removed in the end. In one specific method, swelling is removed by scraping it off using a rubbing SUS material.

Specifically, as shown in FIG. 1, the polyimide film, having been dipped in the alkaline solution, is placed on a flat stainless steel material of 2 mm thick (2 mm thick SUS material). Thereafter, the rubbing SUS material (SUS-304), measuring 150 mm×150 mm, is vertically positioned on the 2 mm thick SUS material in such a manner that an edge of the rubbing SUS material touches a surface of the polyimide film. While maintaining contact, the rubbing SUS material is moved in a direction of arrow in FIG. 1 (direction of moving of rubbing SUS material) at least several tens of times, so as to scrape off swelling (gelled substance).

When scraping the swelling, the edge of the rubbing SUS material is pressed on the surface of the polyimide film with such a force that the polyimide film that has been dipped in the alkaline solution will not break. The swelling is scraped from the both surfaces of the polyimide film. An edge of the rubbing SUS material is used in this manner to scrape off swelling from the both surfaces of the polyimide film, without breaking the polyimide film.

In the swelling removing method, the absence of swelling on the surfaces of the polyimide film is confirmed by touching the film surfaces and by observing the film surfaces by visual inspection. That is, the polyimide film is touched and observed by visual inspection to confirm that the surface condition of the polyimide film is equivalent to that of the polyimide film in distilled water without the alkali solution treatment.

The polyimide film, out of the alkaline solution, should be washed under predetermined washing conditions, so as to yield a swelling coefficient $C_R$ of not more than 20. The washing conditions are not particularly limited and may be any known conditions used in etching of the polyimide film. Generally, the polyimide film is washed in at least one of the following conditions, in which the polyimide film is allowed to stand for 10 minutes in distilled water, the polyimide film is washed by ultrasonic washing for 10 minutes in distilled water, and the polyimide film is washed by ultrasonic for 10 minutes in distilled water.

The inventors of the present invention have found that surface swelling of the polyimide film after alkali etching can be suppressed when the foregoing equation (i) at least gives a swelling coefficient $C_R$ of not more than 20.0, or preferably not more than 10.0, and more preferably not more than 5.0, as will be described later in more detail in Examples.

Figure 3:
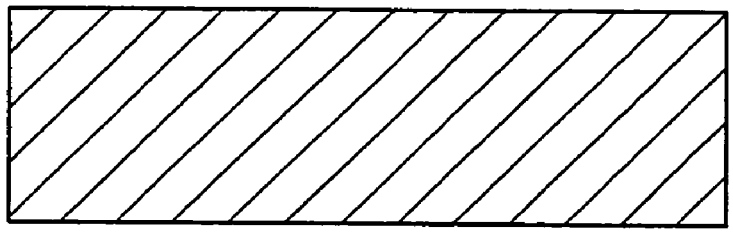
Figure 3:
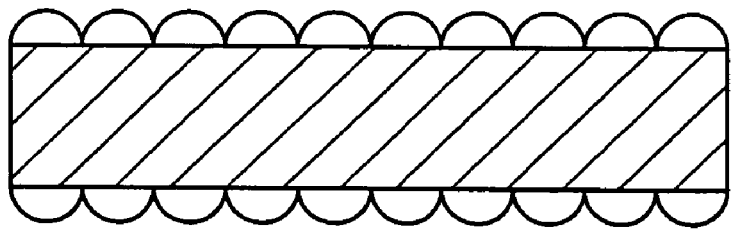
Figure 3:
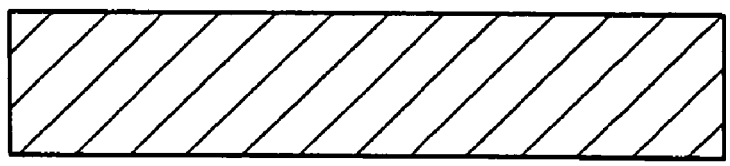

The swelling coefficient $C_R$ is calculated from the polyimide film that goes through the processes shown in FIG. 3(a) through FIG. 3(c). Specifically, when measuring a film weight W0, the polyimide film has not been dipped in the alkaline solution and is the thickest, as FIG. 3(a) indicates. When measuring a film weight W1, the polyimide film has been dipped in the alkaline solution and has swelling (shown in semicircles) on the both sides of the film, as FIG. 3(b) indicates. When measuring a film weight W2, the swelling has been scraped off (removed) and, as FIG. 3(c) indicates, the polyimide film is thinner than that shown in FIG. 3(a).

Here, the alkaline solution or other agents used in etching exposes the polyimide film and causes the film to curl (localized wrinkles). Curling is alleviated when the swelling coefficient $C_R$ is not more than 20. Such deformation has detrimental effects on reliability of electrical connections.

The etchant exposes the polyimide film to cause curling in the following way. Swelling is caused on portions of the polyimide film exposed with the etchant. The polyimide film is dried (shrinks) before the swelling is completely removed. Meanwhile, portions of the polyimide film covered with an etching mask (not in contact with the etchant) do not swell, dry, or shrink. The influence of swelling, drying, and shrinking is thus different and this is likely to be the cause of localized wrinkles and curling of the FPC after the alkali etching.

The inventors of the present invention have found a correlation between curling of the polyimide film that was exposed with an etchant and the likelihood of swelling, and that the rate of curling is lower in polyimide films with a small swelling coefficient, even when these films are exposed to an alkaline solution (etchant) and dried (see Examples below).

Therefore, by the swelling coefficient $C_R$ of the polyimide film at least no greater than the foregoing upper limit values, swelling occurs less often than conventionally, as clearly indicated in FIG. 3(a) through FIG. 3(c). This makes it possible to sufficiently remove swelling in the alkali etching step and in the washing step that follows.

The polyimide film according to the present invention can therefore avoid the conventional problem wherein the polyimide film is dried before swelling is removed from the surfaces of the film, so that the swelling remains as a residue on perforations, end faces, and other portions of the film to lower yield of the polyimide film product. The polyimide film according to the present invention, by avoiding such a problem, can be suitably used for manufacture of FPC and other applications.

The following explains the tear propagation resistance variation $C_H$ of the polyimide film in the condition (1). The present invention defines the tear propagation resistance variation $C_H$ as follows. Namely, the tear propagation resistance variation $C_H$ is the difference of maximum value and minimum value on a measurement chart with respect to a sample piece, which difference is calculated based on measured tear propagation resistance values of the polyimide film according to ASTM D-1938. Note that, for convenience of explanation, the tear propagation resistance variation $C_H$ will be referred to simply as "resistance variation $C_H$" in the explanations that follow.

The following specifically describes how the resistance variation $C_H$ is calculated from the measurement chart of tear propagation resistance values. Generally, the measurement chart of tear propagation resistance values tends to vary depending on calcining conditions of the film or compositions of the polyimide. Specifically, due to an uneven thickness of the measurement sample (sample piece), the tear propagation resistance value varies gradually as in the waveform chart of Pattern 1 in FIG. 2. The maximum and minimum values of such a measurement chart are not used to calculate the resistance variation $C_H$.

Figure 2:
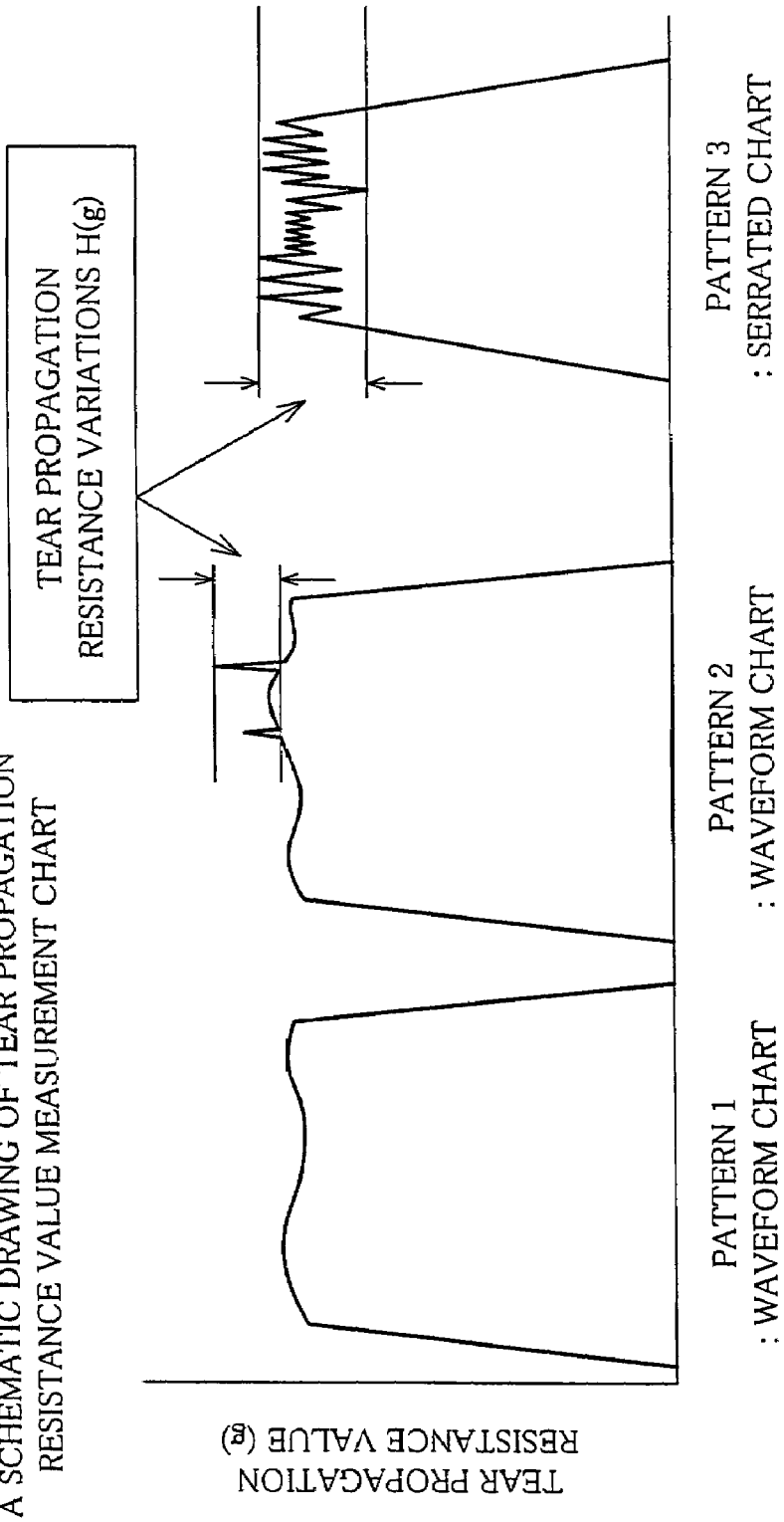
FIG. 2 is waveform charts of tear propagation resistance values, explaining how tear propagation resistance variations are calculated.

Further, the tear propagation resistance value also varies as in Pattern 2 and Pattern 3 of FIG. 2, depending on calcining conditions of the film or compositions of the polyimide. In the waveform chart of Pattern 2, the tear propagation resistance value varies gradually as in Pattern 1 but with spikes. In the serrated chart of Pattern 3, the tear propagation resistance value varies acutely. The resistance variation $C_H$ is calculated when a chart showing such acute variations is obtained as in these patterns.

The resistance variations $C_H$ of the respective patterns are calculated in the following manner. In the waveform chart of Pattern 2, a difference (resistance variation $C_H$) of the maximum value at the tip of the highest spike and the minimum value at the base of the spike on the chart is calculated. In the serrated chart of Pattern 3, a difference (resistance variation $C_H$) of the maximum value and the minimum value of the infinite number of serrations is calculated.

The inventors of the present invention have found that stamping workability of the polyimide film can be improved by controlling the resistance variation $C_H$ to values of 1.0 g or less, as will be described in detail in Examples below. (Refer to Examples below.)

By satisfying the foregoing conditions (1) and/or (2) above, the polyimide film according to the present invention can prevent swelling in the alkali etching process and prevent flashes and chips of film from being generated in the stamping process. The polyimide film according to the present invention can therefore improve productivity of each step and thereby improves alkali etching property and stamping workability.

As noted above, the polyimide film according to the present invention is suitable for various components of electrical devices, such as FPCs and TAB film carriers. In order to improve ease of handling such as conveyance, the elastic modulus of the polyimide film is preferably defined. For example, in the case of an FPC base film, the polyimide film should preferably have a lower limit of elastic modulus at or above 4.0 GPa and an upper limit at or below 12.0 GPa. For polyimide films with a thickness of 12.5 µm and thicker, the elastic modulus should more preferably fall in a range of 4.5 GPa to 9.0 GPa. For polyimide films with a thickness below 12.5 µm, a range of 5.0 GPa to 12.0 GPa is more preferable.

An elastic modulus exceeding 12.0 GPa is not preferable because it makes the polyimide film too stiff to be easily handled in applications where the FPC is bent for storage purposes. On the other hand, an elastic modulus below 4.0 GPa is not preferable because the polyimide film is too flexible in this case and impairs workability by generating wrinkles in a roll-to-roll process. The problem of wrinkles in a roll-to-roll process becomes particularly serious in a vacuum chamber when copper is directly laminated on the polyimide film without using an adhesive, regardless of whether sputtering or vapor deposition is used.

Preferable modes of the present invention will be described below in detail by way of Examples. It should be noted that the Examples below are solely for the purpose of explaining the present invention and the present invention is not limited in any way by the following descriptions. It should also be appreciated that various modifications, adjustments, and alterations are possible by a person ordinary skill in the art within the scope of the present invention.

PRODUCING EXAMPLE 1 OF POLYIMIDE FILM

A reactor was charged with N,N-dimethylformamide (DMF), followed by 5 equivalent of 4,4'-diaminodiphenylether (ODA) and 5 equivalent of paraphenylenediamine (p-PDA). The mixture was stirred until they have completely dissolved.

To the reactor was further added 5 mole equivalent of p-phenylenebis(trimellitic acid monoester anhydride) (PMDA), and the mixture was further stirred for 30 minutes. Then, 4.5 mole equivalent of pyromellitic acid dianhydride (PMDA) was added to the mixture and was stirred therein for 120 minutes. Thereafter, a solution dissolving 0.5 mole equivalent of PMDA in DMF was gradually added and the mixture was cooled and stirred for 60 minutes, so as to obtain a DMF solution of polyamic acid (polyamic acid solution). The amount of DMF was so adjusted that the combined weight of diamine component and acid dianhydride component was 15 wt % with respect to the weight of the polyamic acid solution.

The polyamic acid solution so prepared was mixed with DMF, acetic anhydride (AA), and isoquinoline (IQ). The mixture was then extruded through a die and cast on an endless belt. Thereafter, the mixture was heated and dried until the volatile component reached 50% of the calcined film weight, so as to obtain a self-supporting green sheet.

The green sheet so obtained was detached from the endless belt and the sides of the green sheet were anchored on a pin sheet that is used to continuously convey the green sheet. The green sheet on the pin sheet was successively conveyed to heating furnaces of 200° C., 400° C., and 530° C. for heating. After the heating, the green belt was conveyed to a cooling room and gradually cooled therein. Conveyed out of the cooling room, the film was detached from the pin sheet. The film so obtained was used as polyimide film (1) in Examples 1 through 6 described below.

Note that, the mixture of the polyamic acid solution with the DMF, AA, and IQ was so cast that the thickness of the polyimide film after drying was 50 microns.

EXAMPLE 1

A tear propagation resistance variation $C_H$ of the polyimide film (1) produced in the foregoing Producing Example 1 was measured by the following procedures. First, tear propagation resistance values were calculated according to ASTM D-1938. Here, the measurement chart was adjusted to a full scale of 20 g and a difference of the measured maximum and minimum values was obtained as the tear propagation resistance variation $C_H$.

A swelling coefficient $C_R$ of the polyimide film (1) was also measured as follows. First, a sample piece was prepared by cutting the polyimide film into a 100 mm×100 mm piece. The sample piece was dried for 15 minutes at 150° C. and a film weight W0 was measured immediately after the film was dried. The sample piece was then dipped in an alkaline solution that had been prepared by dissolving potassium hydroxide in a mixed solvent of an 8:2 weight ratio of ethanol and distilled water to the final concentration of 1 mole/litter. The sample piece was maintained therein for 5 minutes at a solution temperature of 40° C.

The sample piece was then taken out of the alkaline solution and was allowed to stand in distilled water for 10 minutes to be washed. The sample piece, out of the distilled water, was dried for 15 minutes at 150° C. and a film weight W1 was measured immediately after the film was dried. Using Equation (ii), an alkali weight reduction rate D1 was calculated.

Another sample piece was prepared and a film weight W0 of this sample piece was measured immediately after it was dried for 15 minutes at 150° C. The sample piece was then dipped in the alkaline solution for 5 minutes at a maintained solution temperature of 40° C. The sample piece, out of the alkaline solution, was placed in distilled water and swelling was removed by rubbing according to the swelling removing method described earlier.

The sample piece was then taken out of the distilled water and a film weight W2 was measured immediately after it was dried for 15 minutes at 150° C. Using Equation (iii), an alkali weight reduction rate D2 was calculated.

Using the alkali weight reduction rates D1 and D2, a swelling coefficient $C_R$ was calculated from Equation (i).

Table 1 shows the results of measurement on swelling coefficient $C_R$ and tear propagation variation $C_H$, along with the conditions used in the measurement.

EXAMPLE 2

A swelling coefficient $C_R$ was measured as in Example 1 except that the sample piece out of the alkaline solution was washed by ultrasonic for 10 minutes in distilled water. The result of measurement and its measurement conditions are shown in Table 1.

EXAMPLE 3

A swelling coefficient $C_R$ was measured as in Example 1 except that the sample piece was dipped in the alkaline solution for 5 minutes in the presence of an ultrasonic wave. The result of measurement and its measurement conditions are shown in Table 1.

EXAMPLE 4

A swelling coefficient $C_R$ was measured as in Example 1 except that the sample piece was dipped in the alkaline solution for 5 minutes in the presence of an ultrasonic wave and the sample piece out of the alkaline solution was washed by ultrasonic for 10 minutes in distilled water. The result of measurement and its measurement conditions are shown in Table 1.

EXAMPLE 5

A swelling coefficient $C_R$ was measured as in Example 1 except that the sample piece was dipped in the alkaline solution and stirred therein for 5 minutes at 100 rpm. The result of measurement and its measurement conditions are shown in Table 1.

EXAMPLE 6

A swelling coefficient $C_R$ was measured as in Example 1 except that the sample piece was dipped in the alkaline solution and stirred therein for 5 minutes at 100 rpm and the sample piece out of the alkaline solution was washed by ultrasonic for 10 minutes in distilled water. The result of measurement and its measurement conditions are shown in Table 1.

PRODUCING EXAMPLE 2 OF POLYIMIDE FILM

A reactor was charged with DMF, followed by 3 mole equivalent of ODA and 1 mole equivalent of p-PDA. The mixture was stirred until they have completely dissolved.

To the reactor was further added 3.5 mole equivalent of PMDA, and the mixture was further stirred for 30 minutes.

Thereafter, a solution dissolving 0.5 mole equivalent of PMDA in DMF was gradually added and the mixture was cooled and stirred for 60 minutes, so as to obtain a DMF solution of polyamic acid (polyamic acid solution). The amount of DMF was so adjusted that the combined weight of diamine component and acid dianhydride component was 15 wt % with respect to the weight of the polyamic acid organic solvent solution.

By following the Producing Example 1 for the rest of the procedures, a polyimide film was obtained. The polyimide film so obtained was used as polyimide film (2) in the following Comparative Examples 1 through 6.

COMPARATIVE EXAMPLE 1

As in Example 1, a swelling coefficient $C_R$ and a tear propagation resistance variation $C_H$ of the polyimide film (2) produced in the foregoing Producing Example 2 were measured. The result of measurement and its measurement conditions are shown in Table 1.

COMPARATIVE EXAMPLE 2

As in Example 2, a swelling coefficient $C_R$ of the polyimide film (2) produced in the foregoing Producing Example 2 was measured. The result of measurement and its measurement conditions are shown in Table 1.

COMPARATIVE EXAMPLE 3

As in Example 3, a swelling coefficient $C_R$ of the polyimide film (2) produced in the foregoing Producing Example 2 was measured. The result of measurement and its measurement conditions are shown in Table 1.

COMPARATIVE EXAMPLE 4

As in Example 4, a swelling coefficient $C_R$ of the polyimide film (2) produced in the foregoing Producing Example 2 was measured. The result of measurement and its measurement conditions are shown in Table 1.

COMPARATIVE EXAMPLE 5

As in Example 5, a swelling coefficient $C_R$ of the polyimide film (2) produced in the foregoing Producing Example 2 was measured. The result of measurement and its measurement conditions are shown in Table 1.

COMPARATIVE EXAMPLE 6

As in Example 6, a swelling coefficient $C_R$ of the polyimide film (2) produced in the foregoing Producing Example 2 was measured. The result of measurement and its measurement conditions are shown in Table 1.

PRODUCING EXAMPLE 3 OF POLYIMIDE FILM

A polyimide film was obtained as in Producing Example 1 except that the green sheet anchored on the pin sheet was successively conveyed to heating furnaces of 200° C., 400° C., and 510° C. for heating. The polyimide film so obtained was used as polyimide film (3) in the following Comparative Examples 7 through 12.

COMPARATIVE EXAMPLE 7

As in Example 1, a swelling coefficient $C_R$ and a tear propagation resistance variation $C_H$ of the polyimide film (3) produced in the foregoing Producing Example 3 were measured. The result of measurement and its measurement conditions are shown in Table 1.

COMPARATIVE EXAMPLE 8

As in Example 2, a swelling coefficient $C_R$ of the polyimide film (3) produced in the foregoing Producing Example 3 was measured. The result of measurement and its measurement conditions are shown in Table 1.

COMPARATIVE EXAMPLE 9

As in Example 3, a swelling coefficient $C_R$ of the polyimide film (3) produced in the foregoing Producing Example 3 was measured. The result of measurement and its measurement conditions are shown in Table 1.

COMPARATIVE EXAMPLE 10

As in Example 4, a swelling coefficient $C_R$ of the polyimide film (3) produced in the foregoing Producing Example 3 was measured. The result of measurement and its measurement conditions are shown in Table 1.

COMPARATIVE EXAMPLE 11

As in Example 5, a swelling coefficient $C_R$ of the polyimide film (3) produced in the foregoing Producing Example 3 was measured. The result of measurement and its measurement conditions are shown in Table 1.

COMPARATIVE EXAMPLE 12

As in Example 6, a swelling coefficient $C_R$ of the polyimide film (3) produced in the foregoing Producing Example 3 was measured. The result of measurement and its measurement conditions are shown in Table 1.

PRODUCING EXAMPLE 4 OF POLYIMIDE FILM

A polyamic acid solution was obtained as in Producing Example 2. A polyimide film was obtained as in Producing Example 1 except that the green sheet anchored on the pin sheet was successively conveyed to heating furnaces of 200° C., 400° C., and 510° C. for heating as in Producing Example 3. The polyimide film so obtained was used as polyimide film (4) in the following Comparative Examples 13 through 18.

COMPARATIVE EXAMPLE 13

As in Example 1, a swelling coefficient $C_R$ and a tear propagation resistance variation $C_H$ of the polyimide film (4) produced in the foregoing Producing Example 4 were measured. The result of measurement and its measurement conditions are shown in Table 1.

COMPARATIVE EXAMPLE 14

As in Example 2, a swelling coefficient $C_R$ of the polyimide film (4) produced in the foregoing Producing Example 4 was measured. The result of measurement and its measurement conditions are shown in Table 1.

COMPARATIVE EXAMPLE 15

As in Example 3, a swelling coefficient $C_R$ of the polyimide film (4) produced in the foregoing Producing Example 4 was measured. The result of measurement and its measurement conditions are shown in Table 1.

COMPARATIVE EXAMPLE 16

As in Example 4, a swelling coefficient $C_R$ of the polyimide film (4) produced in the foregoing Producing Example 4 was measured. The result of measurement and its measurement conditions are shown in Table 1.

COMPARATIVE EXAMPLE 17

As in Example 5, a swelling coefficient $C_R$ of the polyimide film (4) produced in the foregoing Producing Example 4 was measured. The result of measurement and its measurement conditions are shown in Table 1.

COMPARATIVE EXAMPLE 18

As in Example 6, a swelling coefficient $C_R$ of the polyimide film (4) produced in the foregoing Producing Example 4 was measured. The result of measurement and its measurement conditions are shown in Table 1.

PRODUCING EXAMPLE 5 OF POLYIMIDE FILM

A reactor was charged with DMF, followed by 30 mole equivalent of p-PDA and 70 mole equivalent of ODA. The mixture was stirred until they have completely dissolved.

To the reactor was further added 70 mole equivalent of PMDA, and the mixture was further stirred until the PDMA has completely dissolved. Then, 29 mole equivalent of 3,3'-4,4'-diphenyltetracarboxylic acid dianhydride (BPDA) was added and the mixture was stirred until it has completely dissolved therein. Thereafter, a solution dissolving 1 mole equivalent of PMDA in DMF was gradually added and the mixture was cooled and stirred for 60 minutes, so as to obtain a DMF solution of polyamic acid (polyamic acid solution). The amount of DMF was so adjusted that the combined weight of diamine component and acid dianhydride component was 15 wt % with respect to the weight of the polyamic acid solution.

By following the Producing Example 1 for the rest of the procedures, a polyimide film was obtained. The polyimide film so obtained was used as polyimide film (5) in the following Examples 7 through 12.

EXAMPLE 7

As in Example 1, a swelling coefficient $C_R$ and a tear propagation resistance variation $C_H$ of the polyimide film (5) produced in the foregoing Producing Example 5 were measured. The result of measurement and its measurement conditions are shown in Table 1.

EXAMPLE 8

As in Example 2, a swelling coefficient $C_R$ of the polyimide film (5) produced in the foregoing Producing Example 5 was measured. The result of measurement and its measurement conditions are shown in Table 1.

EXAMPLE 9

As in Example 3, a swelling coefficient $C_R$ of the polyimide film (5) produced in the foregoing Producing Example 5 was measured. The result of measurement and its measurement conditions are shown in Table 1.

EXAMPLE 10

As in Example 4, a swelling coefficient $C_R$ of the polyimide film (5) produced in the foregoing Producing Example 5 was measured. The result of measurement and its measurement conditions are shown in Table 1.

EXAMPLE 11

As in Example 5, a swelling coefficient $C_R$ of the polyimide film (5) produced in the foregoing Producing Example 5 was measured. The result of measurement and its measurement conditions are shown in Table 1.

EXAMPLE 12

As in Example 6, a swelling coefficient $C_R$ of the polyimide film (5) produced in the foregoing Producing Example 5 was measured. The result of measurement and its measurement conditions are shown in Table 1.

TABLE 1

| | ETCHING CONDITION | ALKALI WEIGHT REDUCTION RATES | | SWELLING COEFFICIENT | TEAR PROPAGATION |
| --- | --- | --- | --- | --- | --- |
| | | D1 (%) [CONDITION] | D2 (%) | $C_R$ | VARIATION $C_H$ |
| EX. 1 | STAND | 4.8 [WATER WASH-STAND] | 4.9 | 2.0 | 0.2 |
| EX. 2 | STAND | 4.8 [WATER WASH-ULTRASONIC] | 4.8 | 0 | — |
| EX. 3 | ULTRASONIC | 5.0 [WATER WASH-STAND] | 5.0 | 0 | — |
| EX. 4 | ULTRASONIC | 5.0 [WATER WASH-ULTRASONIC] | 5.2 | 3.8 | — |
| EX. 5 | STIRRING | 5.1 [WATER WASH-STAND] | 5.1 | 0 | — |
| EX. 6 | STIRRING | 5.1 [WATER WASH-ULTRASONIC] | 5.2 | 1.9 | — |
| COM. EX. 1 | STAND | 0 [WATER WASH-STAND] | 14 | 100 | 0.4 |
| COM. EX. 2 | STAND | 0 [WATER WASH-ULTRASONIC] | 13 | 100 | — |
| COM. EX. 3 | ULTRASONIC | 0 [WATER WASH-STAND] | 12.6 | 100 | — |
| COM. EX. 4 | ULTRASONIC | 0 [WATER WASH-ULTRASONIC] | 13 | 100 | — |
| COM. EX. 5 | STIRRING | 0 [WATER WASH-STAND] | 14.4 | 100 | — |

TABLE 1-continued

| | ETCHING CONDITION | ALKALI WEIGHT REDUCTION RATES D1 (%) [CONDITION] | D2 (%) | SWELLING COEFFICIENT $C_R$ | TEAR PROPAGATION VARIATION $C_H$ |
|---|---|---|---|---|---|
| COM. EX. 6 | STIRRING | 0 [WATER WASH-ULTRASONIC] | 14.4 | 100 | — |
| COM. EX. 7 | STAND | 4.8[WATER WASH-STAND] | 4.9 | 2.0 | 1.5 |
| COM. EX. 8 | STAND | 4.8[WATER WASH-ULTRASONIC] | 4.8 | 0 | — |
| COM. EX. 9 | ULTRASONIC | 5.0[WATER WASH-STAND] | 5.0 | 0 | — |
| COM. EX. 10 | ULTRASONIC | 5.0[WATER WASH-ULTRASONIC] | 5.2 | 3.8 | — |
| COM. EX. 11 | STIRRING | 5.1[WATER WASH-STAND] | 5.1 | 0 | — |
| COM. EX. 12 | STIRRING | 5.1[WATER WASH-ULTRASONIC] | 5.2 | 1.9 | — |
| COM. EX. 13 | STAND | 0[WATER WASH-STAND] | 23 | 100 | 1.7 |
| COM. EX. 14 | STAND | 0[WATER WASH-ULTRASONIC] | 22 | 100 | — |
| COM. EX. 15 | ULTRASONIC | 0[WATER WASH-STAND] | 21 | 100 | — |
| COM. EX. 16 | ULTRASONIC | 0[WATER WASH-ULTRASONIC] | 22 | 100 | — |
| COM. EX. 17 | STIRRING | 0[WATER WASH-STAND] | 24 | 100 | — |
| COM. EX. 18 | STIRRING | 0[WATER WASH-ULTRASONIC] | 24 | 100 | — |
| EX. 7 | STAND | 2.1[WATER WASH-STAND] | 2.2 | 4.5 | 0.5 |
| EX. 8 | STAND | 2.1[WATER WASH-ULTRASONIC] | 2.1 | 0 | — |
| EX. 9 | ULTRASONIC | 2.1[WATER WASH-STAND] | 2.3 | 8.7 | — |
| EX. 10 | ULTRASONIC | 2.3[WATER WASH-ULTRASONIC] | 2.3 | 0 | — |
| EX. 11 | STIRRING | 2.4[WATER WASH-STAND] | 2.6 | 7.7 | — |
| EX. 12 | STIRRING | 2.4[WATER WASH-ULTRASONIC] | 2.5 | 4.0 | — |

As Table 1 indicates, the polyimide films (1) and (5) that were produced in the Producing Examples (1) and (5) and evaluated in Examples 1 through 6 and Examples 7 through 12 have small swelling coefficients $C_R$ of not more than 10 and tear propagation resistance variations $C_H$ of not more than 1. It can be seen from this that these polyimide films have superior properties and can be used as the polyimide films according to the present invention.

The polyimide film (2) that was produced in the Producing Example 2 and evaluated in Comparative Examples 1 through 6 have a large swelling coefficient $C_R$ and a tear propagation resistance variation $C_H$ of not more than 1. The polyimide film (3) that was produced in the Producing Example 3 and evaluated in Comparative Examples 7 through 12 has a tear propagation resistance variation $C_H$ of not less than 1 and a small swelling coefficient $C_R$. Thus, the polyimide (2) and (3) of the Producing Examples 2 and 3 can also be regarded as the polyimide films according to the present invention and can sufficiently have superior workability depending on their use.

In contrast, the polyimide film (4) that was produced by the Producing Example 4 and evaluated in Comparative Examples 13 through 18 has a large swelling coefficient $C_R$ and a tear propagation resistance variation $C_H$ of not less than 1. These properties are clearly inferior to those in the polyimide films according to the present invention.

Note that, the polyimide films (2) and (3) of the Producing Examples 2 and 3, which are also the polyimide films according to the present invention, were evaluated in Comparative Examples 1 through 6 and Comparative Examples 8 through 12, respectively, for convenience of explanation. This does not limit the scope of the present invention in any way.

EXAMPLE 13

Sets of 20 sample pieces, each set having a different resistance variation $C_H$, were prepared from polyimide films of the compositions as produced in the Producing Examples 1 and 2. The sample pieces were stamped using a stamping mold (**; Ø=2 mm), and a flash occurrence rate $O_c$, which is the proportion of sample pieces that have generated flashes, was found by observing the stamped profiles under a microscope and from Equation (iv) below.

$$\text{Flash occurrence rate } O_c(\%) = (p/n) \times 100 \qquad \text{(iv)}$$

where p is the number of sample pieces that have generated flashes, and n in the total number of sample pieces. Here, n=20.

Figure 5:
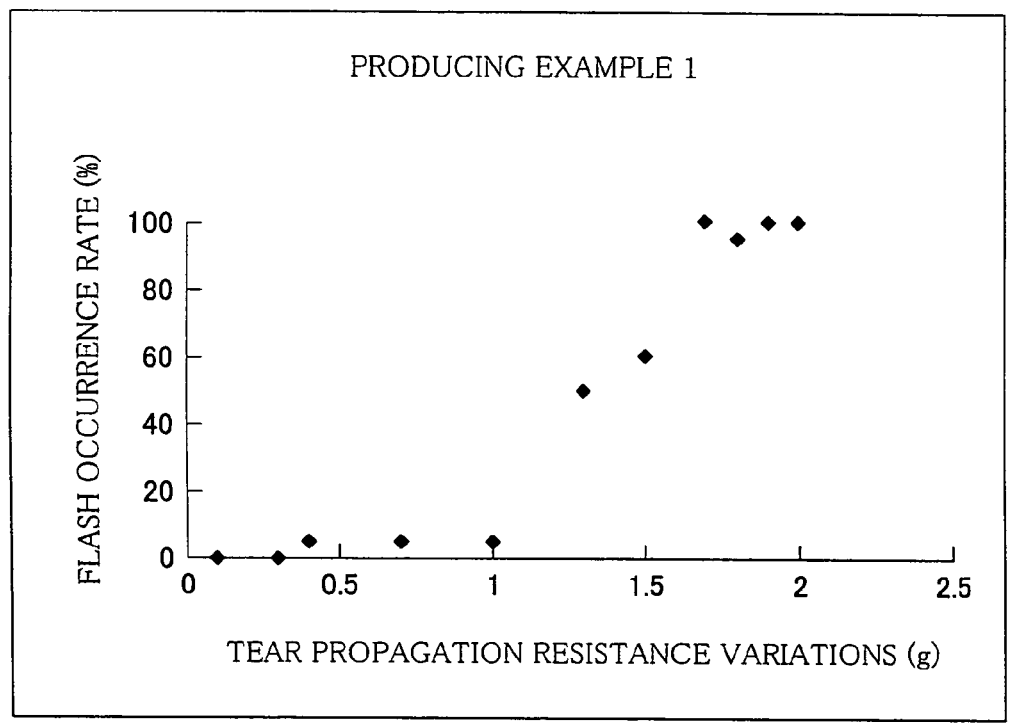
FIG. 5(a) is a graph showing a correlation between tear propagation resistance variation and flash occurrence rate in a polyimide film that was produced by a Producing Example 1 of a polyimide film.
FIG. 5(b) is a graph showing a correlation between tear propagation resistance variation and flash occurrence rate in a polyimide film that was produced by a Producing Example 2 of a polyimide film.
Figure 5:
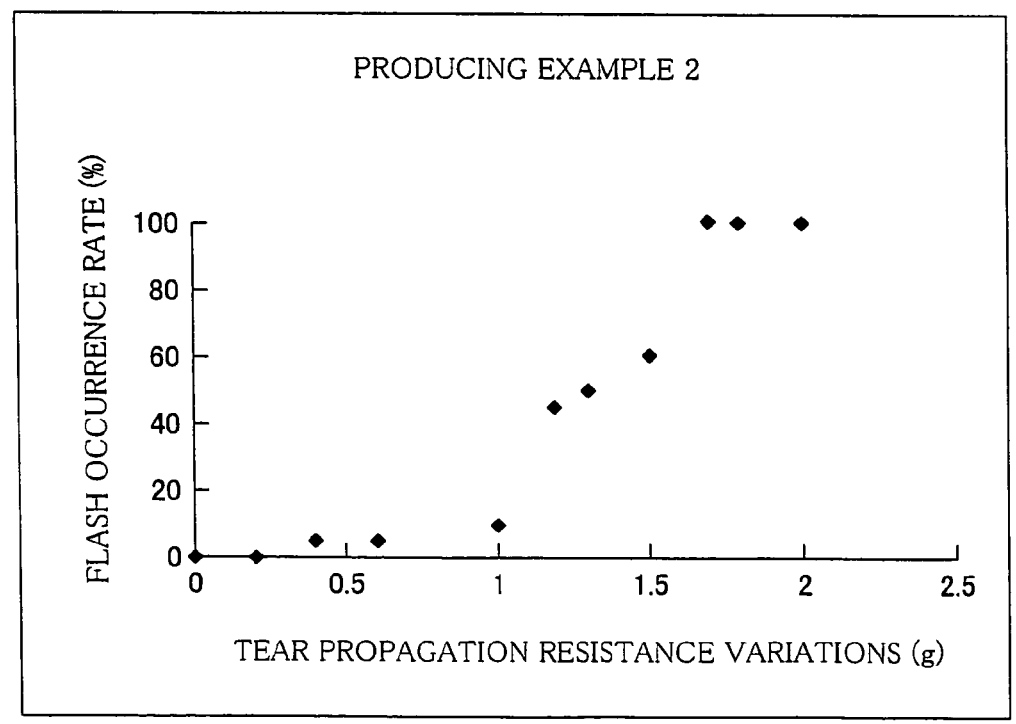

Table 2 and FIG. 5(a) show the result of measurement of flash occurrence rate $O_c$ for the polyimide film of the Producing Example 1, and Table 3 and FIG. 5(b) show the result of flash occurrence rate $O_c$ for the polyimide film of the Producing Example 2.

TABLE 2

| TEAR PROPAGATION RESISTANCE VARIATION $C_H$ (g) | 2 | 1.9 | 1.8 | 1.7 | 1.5 | 1.3 | 1 | 0.7 | 0.4 | 0.3 | 0.1 |
|---|---|---|---|---|---|---|---|---|---|---|---|
| FLASH OCCURRENCE RATE $O_C$ (%) | 100 | 100 | 95 | 100 | 60 | 50 | 5 | 5 | 5 | 0 | 0 |

TABLE 3

| TEAR PROPAGATION RESISTANCE VARIATION $C_H$ (g) | 2 | 1.8 | 1.7 | 1.5 | 1.3 | 1.2 | 1 | 0.6 | 0.4 | 0.2 | 0 |
|---|---|---|---|---|---|---|---|---|---|---|---|
| FLASH OCCURRENCE RATE $O_C$ (%) | 100 | 100 | 100 | 60 | 50 | 45 | 10 | 5 | 5 | 0 | 0 |

As can be seen from Tables 2 and 3 and FIGS. 5(a) and 5(b), there is a strong correlation between the resistance variation $C_H$ and the flash occurrence rate $O_c$, wherein the flash occurrence rate $O_c$ shows an abrupt change at the critical value where the resistance variation $C_H$=1. It can be seen from this result that a resistance variation $C_H$ of not more than 1 is preferable to reduce flash occurrence rate $O_c$ and to improve workability.

EXAMPLE 14

An alkaline solution was prepared by dissolving potassium hydroxide in a mixed solvent of an 8:2 weight ratio of ethanol and distilled water to the final concentration of 1 mole/litter. The polyimide film of the Producing Example 1, which had been cut into a square of 100 mm×100 mm, was dipped in the alkaline solution and maintained therein for 5 minutes at 40° C. The polyimide film was then taken out of the alkaline solution and dried for 15 minutes at 150° C.

Figure 4:
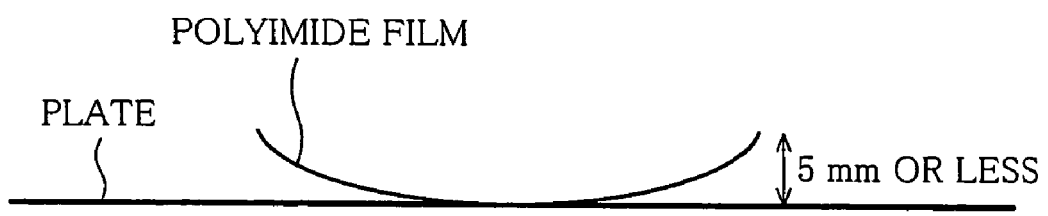
FIG. 4 is a schematic drawing showing a state in which curling is observed by visual inspection.

The polyimide film, after it was dried, was placed on a level plate as shown in FIG. 4, and a degree of curl was observed by visual inspection. The result is shown in Table 4 with the swelling coefficients $C_R$ of the polyimide film.

COMPARATIVE EXAMPLE 19

Curling was observed as in Example 14 except that the polyimide film of the Producing Example 2 was used. The result is shown in Table 4 with the swelling coefficients $C_R$ of the polyimide film.

TABLE 4

| | SWELLING COEFFICIENT $C_R$ | CURLING |
|---|---|---|
| EXAMPLE 14 | 2.0 | The film is substantially flat and a raised portion of the film is at most 5 mm in height. Desirable curling. |
| COMPARATIVE EXAMPLE 19 | 100 | The film is substantially in the form of a circular cylinder. Poor curling. |

The present invention therefore provides polyimide films having a superior alkali etching property and superior stamping workability, so as to prevent swelling in an alkali etching process and prevent flashes or chips of film from being generated in a film stamping process and thereby improve productivity of each step.

The invention being thus described by way of specific embodiments and examples in the foregoing best mode for carrying out the invention section, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

As described, the present invention provides a polyimide film having superior workability (in alkali etching) and superior workability in film stamping. The polyimide film can be suitably used, for example, in an industry producing electrical device components such as flexible printed wiring circuit boards (FPC), film carriers for tape automated bonding (TAB), and chip-on-flex (or chip-on-film, COF), or an engineering material industry producing, for example, a structural material for aircraft and the like, in addition to conventionally known fields in which the polyimide film is used.

What is claimed is:

1. A polyimide film with a tear propagation resistance variation of not more than 1.0 g, comprising not less than 25 mol % of paraphenylene diamine and not less than 25 mol % of 4,4-diaminodiphenylether, both as diamine components, with respect to a total diamine component said polyimide film comprising a repeating unit of formula (1) below in its molecules

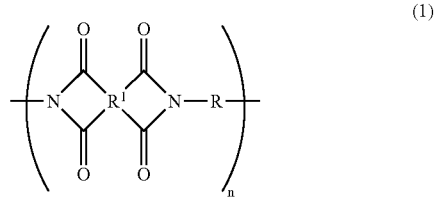

(1)

where R is

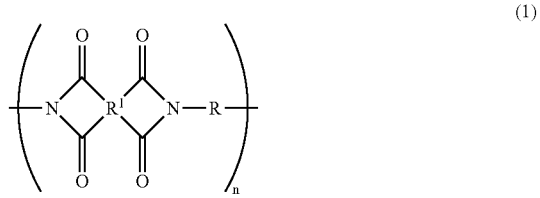

(1)

and where n of the group R is an integer of 1 to 3, X and Y are independently a hydrogen, a halogen, a carboxyl group, a lower alkyl group with no greater than 6 carbon atoms, or a lower alkoxy group with no greater than 6 carbon atoms, and A is —O—, —S—, —CO—, —SO$_2$—, or —CH$_2$—, and where R$^1$ is selected from the group consisting of

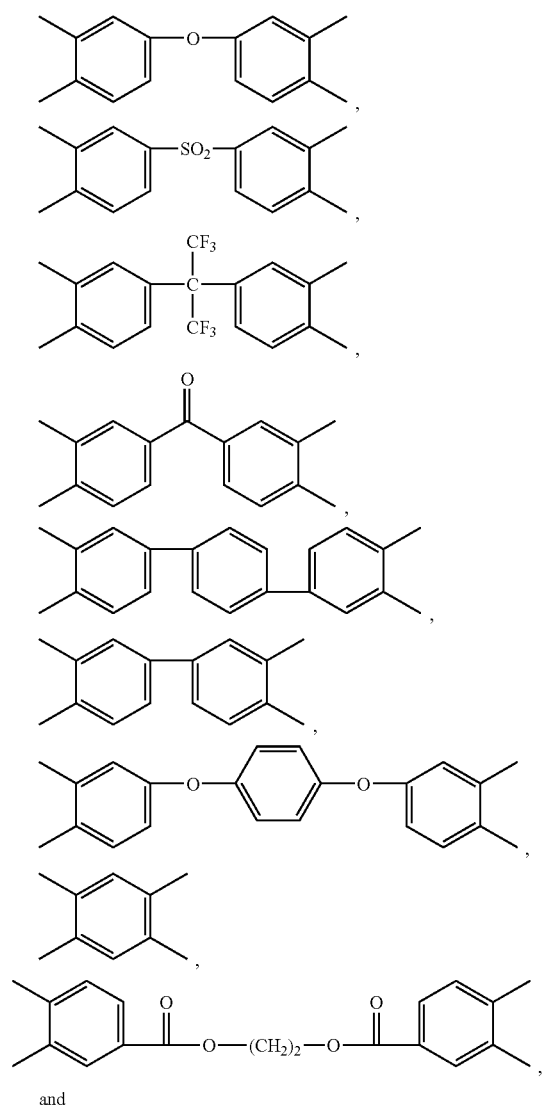

where R² in formula (3) is a divalent organic group that is selected from the group consisting of

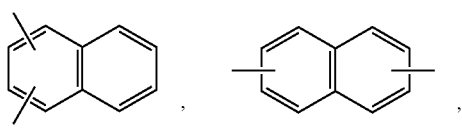

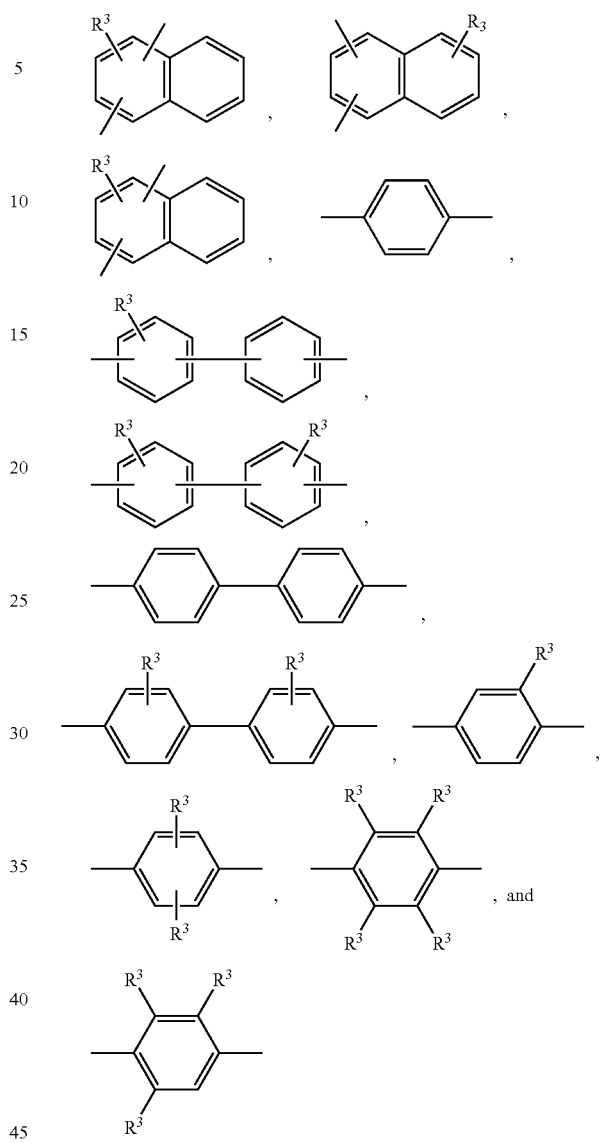

where R³ is independently —CH₃, —Cl, —Br, —F, or —CH₃O.

2. A polyimide film according to claim 1, further comprising a repeating unit of formula (2) below in its molecules

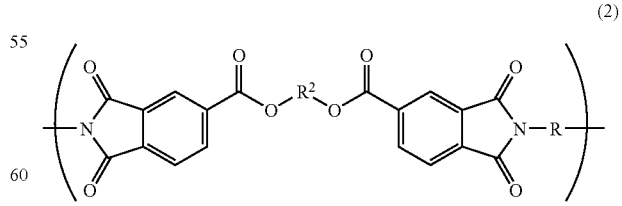

where R is the same as that of the formula (1), and R² is the same as that of the formula (3).

3. A polyimide film according to claim 1, further comprising a repeating unit of formula (4) below in its molecules

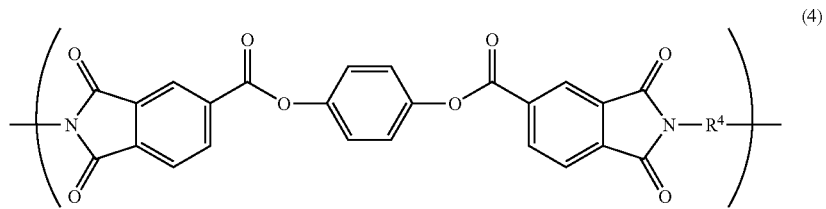

where R⁴ is a divalant organic group selected from the group consisting of

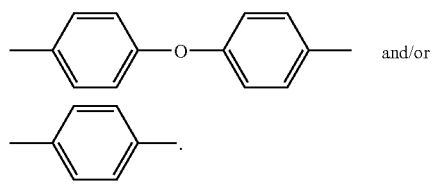 and/or

4. A polyimide film according to claim 1, further comprising a repeating unit of formula (5) below in its molecules

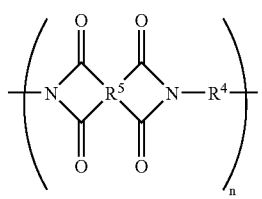

where R⁵ is a at least two kinds selected from the group consisting of

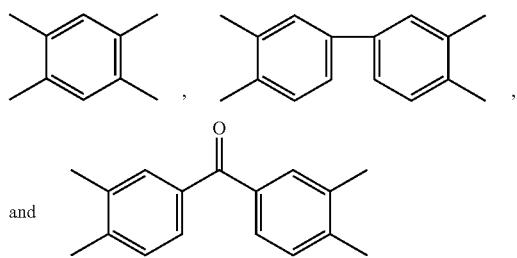

and and R⁴ is a divalent organic group that is represented by

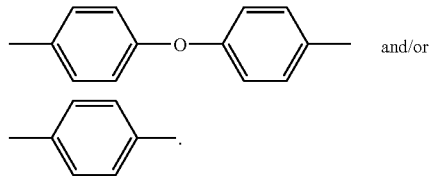 and/or

5. A polyimide film according to claim 1, further comprising repeating units of formulae (6), (7), (8), and (9) below in its molecules

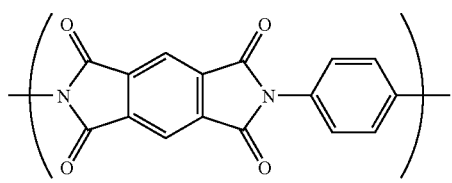

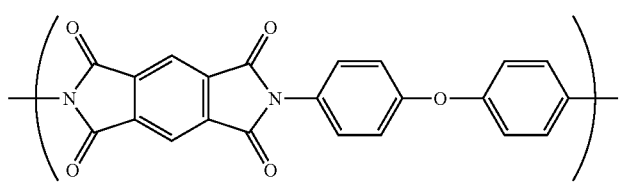

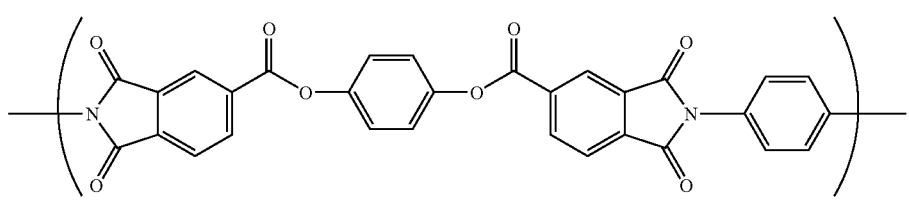

-continued

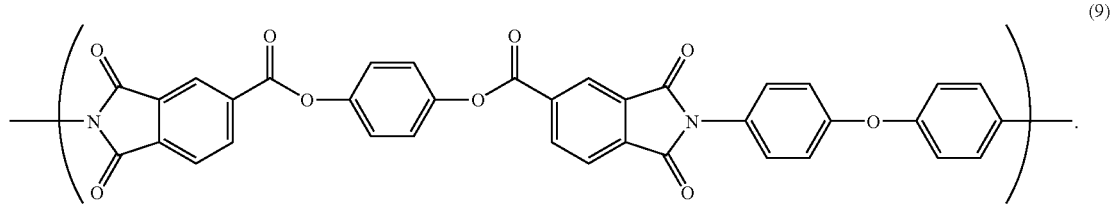

6. A producing process of a flexible printed circuit board, comprising the step of stamping a polyimide film with a tear propagation resistance variation of not more than 1.0 g, and not less than 25 mol % of paraphenylene diamine and not less than 25 mol % of 4,4-diaminodiphenylether, both as diamine components, with respect to a total diamine component, said polyimide film comprising a repeating unit of formula (1) below in its molecules

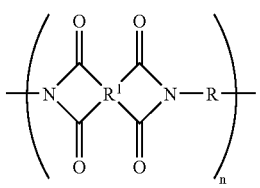

where R is

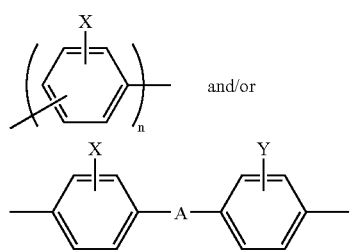

and where n of the group R is an integer of 1 to 3, X and Y are independently a hydrogen, a halogen, a carboxyl group, a lower alkyl group with no greater than 6 carbon atoms, or a lower alkoxy group with no greater than 6 carbon atoms, and A is —O—, —S—, —CO—, —SO$_2$—, or —CH$_2$—, and where $R^1$ is selected from the group consisting of

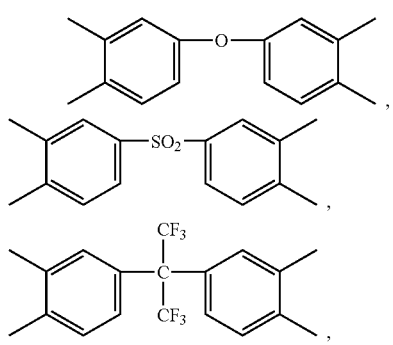

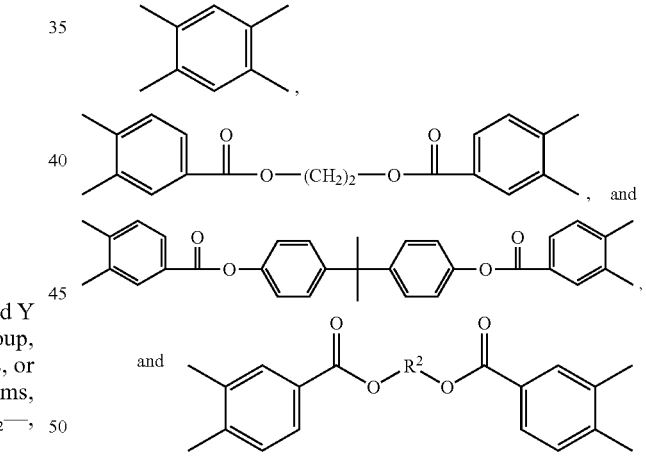

where $R^2$ in formula (3) is a divalent organic group that is selected from the group consisting of

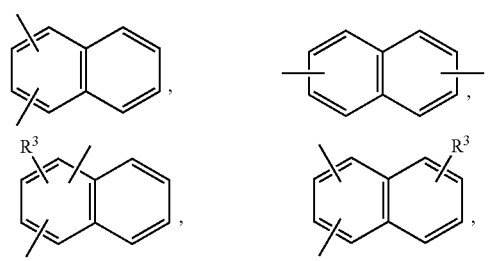

-continued
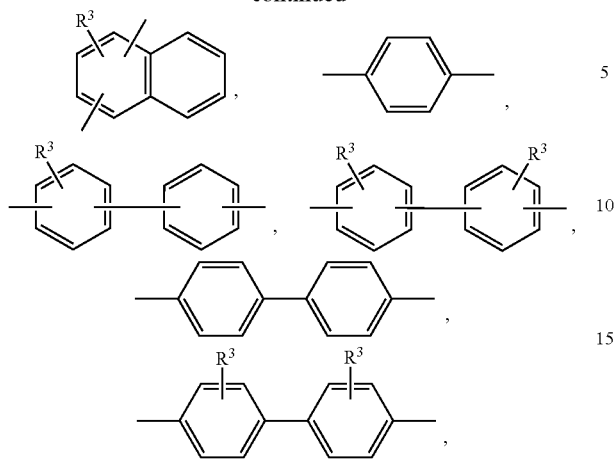
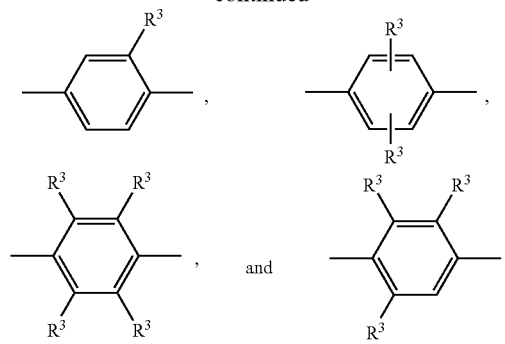
where $R^3$ is independently —$CH_3$, —Cl, —Br, —F, or —$CH_3O$.
* * * * *